United States Patent
Gupta et al.

(10) Patent No.: US 12,524,786 B2
(45) Date of Patent: Jan. 13, 2026

(54) METHODS AND SYSTEMS FOR DETERMINING GUEST SATISFACTION INCLUDING GUEST SLEEP QUALITY IN HOTELS

(71) Applicant: Honeywell International Inc., Morris Plains, NJ (US)

(72) Inventors: Bhavesh Gupta, Bangalore (IN); Gunjan Chanduka, Bangalore (IN); Magesh Lingan, Bangalore (IN); Zhongshengyun Gao, Shanghai (CN); Gregory Wade Howard, Amston, CT (US); Raushan Kumar Ravi, Burnaby (CA); Prabhat Ranjan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 635 days.

(21) Appl. No.: 16/985,011

(22) Filed: Aug. 4, 2020

(65) Prior Publication Data
US 2022/0044286 A1   Feb. 10, 2022

(51) Int. Cl.
*G06Q 30/0282*   (2023.01)
*G06Q 50/12*   (2012.01)
(Continued)

(52) U.S. Cl.
CPC ......... *G06Q 30/0282* (2013.01); *G06Q 50/12* (2013.01); *G06F 3/14* (2013.01); *H04L 67/12* (2013.01)

(58) Field of Classification Search
CPC ............................ G06Q 30/0282; G06Q 50/12
See application file for complete search history.

(56) References Cited

U.S. PATENT DOCUMENTS

| 191,512 A | 6/1877 | Bennett et al. |
| 4,009,647 A | 3/1977 | Howorth |

(Continued)

FOREIGN PATENT DOCUMENTS

| CA | 2387100 A1 | 11/2003 |
| CA | 2538139 A1 | 3/2005 |

(Continued)

OTHER PUBLICATIONS

A. Kealy, K. McDaid, J. Loane, L. Walsh and J. Doyle, "Derivation of night time behaviour metrics using ambient sensors," 2013 7th International Conference on Pervasive Computing Technologies for Healthcare and Workshops, Venice, Italy, 2013, pp. 33-40, doi: 10.4108/icst.pervasivehealth.2013.252095. (Year: 2013).*

(Continued)

*Primary Examiner* — Lynda Jasmin
*Assistant Examiner* — Ehrin L Pratt
(74) *Attorney, Agent, or Firm* — Seager, Tufte & Wickhem, LLP

(57) ABSTRACT

A system provides for evaluating a hotel guest's satisfaction of a hotel, the hotel including a plurality of guest rooms, the hotel guest staying in a guest room of the plurality of guest rooms in the hotel. The system includes one or more sensors within the guest room that are configured to provide data points indicative of guest activities in the guest room, the one or more sensors operably coupled to a hotel network within the hotel. A server is remote from the guest room and is configured to receive the data points from the one or more sensors via a connection to the hotel network and to use the data points to calculate a guest satisfaction score for the guest room. The server is configured to display the guest satisfaction score.

19 Claims, 15 Drawing Sheets

(51) Int. Cl.
*G06F 3/14* (2006.01)
*H04L 67/12* (2022.01)

(56) References Cited

U.S. PATENT DOCUMENTS

| | | |
|---|---|---|
| 4,375,637 A | 3/1983 | Desjardins |
| 4,918,615 A | 4/1990 | Suzuki et al. |
| 4,939,922 A | 7/1990 | Smalley et al. |
| 5,566,084 A | 10/1996 | Cmar |
| 5,727,579 A | 3/1998 | Chardack |
| 5,745,126 A | 4/1998 | Jain et al. |
| 5,751,916 A | 5/1998 | Kon et al. |
| 5,777,598 A | 7/1998 | Gowda et al. |
| 5,973,662 A | 10/1999 | Singers et al. |
| 6,065,842 A | 5/2000 | Fink |
| 6,139,177 A | 10/2000 | Venkatraman et al. |
| 6,144,993 A | 11/2000 | Fukunaga et al. |
| 6,157,943 A | 12/2000 | Meyer |
| 6,229,429 B1 | 5/2001 | Horon |
| 6,238,337 B1 | 5/2001 | Kambhatla et al. |
| 6,334,211 B1 | 12/2001 | Kojima et al. |
| 6,353,853 B1 | 3/2002 | Gravlin |
| 6,369,695 B2 | 4/2002 | Horon |
| 6,375,038 B1 | 4/2002 | Daansen et al. |
| 6,429,868 B1 | 8/2002 | Dehner, Jr. et al. |
| 6,473,084 B1 | 10/2002 | Phillips et al. |
| 6,487,457 B1 | 11/2002 | Hull et al. |
| 6,580,950 B1 | 6/2003 | Johnson et al. |
| 6,598,056 B1 | 7/2003 | Hull et al. |
| 6,619,555 B2 | 9/2003 | Rosen |
| 6,704,012 B1 | 3/2004 | Lefave |
| 6,720,874 B2 | 4/2004 | Fufido et al. |
| 6,741,915 B2 | 5/2004 | Poth |
| 6,796,896 B2 | 9/2004 | Laiti |
| 6,801,199 B1 | 10/2004 | Wallman |
| 6,816,878 B1 | 11/2004 | Zimmers et al. |
| 6,876,951 B2 | 4/2005 | Skidmore et al. |
| 6,882,278 B2 | 4/2005 | Winings et al. |
| 6,904,385 B1 | 6/2005 | Budike, Jr. |
| 6,907,387 B1 | 6/2005 | Reardon |
| 6,911,177 B2 | 6/2005 | Deal |
| 6,993,403 B1 | 1/2006 | Dadebo et al. |
| 6,993,417 B2 | 1/2006 | Osann, Jr. |
| 7,023,440 B1 | 4/2006 | Havekost et al. |
| 7,031,880 B1 | 4/2006 | Seem et al. |
| 7,062,722 B1 | 6/2006 | Carlin et al. |
| 7,110,843 B2 | 9/2006 | Pagnano et al. |
| 7,139,685 B2 | 11/2006 | Bascle et al. |
| 7,164,972 B2 | 1/2007 | Imhof et al. |
| 7,183,899 B2 | 2/2007 | Behnke |
| 7,200,639 B1 | 4/2007 | Yoshida |
| 7,222,111 B1 | 5/2007 | Budike, Jr. |
| 7,222,800 B2 | 5/2007 | Wruck |
| 7,257,397 B2 | 8/2007 | Shamoon et al. |
| 7,280,030 B1 | 10/2007 | Monaco |
| 7,292,908 B2 | 11/2007 | Borne et al. |
| 7,295,116 B2 | 11/2007 | Kumar et al. |
| 7,302,313 B2 | 11/2007 | Sharp et al. |
| 7,308,323 B2 | 12/2007 | Kruk et al. |
| 7,308,388 B2 | 12/2007 | Beverina et al. |
| 7,313,447 B2 | 12/2007 | Hsiung et al. |
| 7,346,433 B2 | 3/2008 | Budike, Jr. |
| 7,356,548 B1 | 4/2008 | Culp et al. |
| 7,379,782 B1 | 5/2008 | Cocco |
| 7,383,148 B2 | 6/2008 | Ahmed |
| 7,434,742 B2 | 10/2008 | Mueller et al. |
| 7,447,333 B1 | 11/2008 | Masticola et al. |
| 7,466,224 B2 | 12/2008 | Ward et al. |
| 7,496,472 B2 | 2/2009 | Seem |
| 7,512,450 B2 | 3/2009 | Ahmed |
| 7,516,490 B2 | 4/2009 | Riordan et al. |
| 7,548,833 B2 | 6/2009 | Ahmed |
| 7,551,092 B1 | 6/2009 | Henry |
| 7,557,729 B2 | 7/2009 | Hubbard et al. |
| 7,567,844 B2 | 7/2009 | Thomas et al. |
| 7,596,473 B2 | 9/2009 | Hansen et al. |
| 7,610,910 B2 | 11/2009 | Ahmed |
| 7,626,507 B2 | 12/2009 | LaCasse |
| 7,664,574 B2 | 2/2010 | Imhof et al. |
| 7,682,464 B2 | 3/2010 | Glenn et al. |
| 7,702,421 B2 | 4/2010 | Sullivan et al. |
| 7,729,882 B2 | 6/2010 | Seem |
| 7,755,494 B2 | 7/2010 | Melker et al. |
| 7,761,310 B2 | 7/2010 | Rodgers |
| 7,774,227 B2 | 8/2010 | Srivastava |
| 7,797,188 B2 | 9/2010 | Srivastava |
| 7,819,136 B1 | 10/2010 | Eddy |
| 7,822,806 B2 | 10/2010 | Frank et al. |
| 7,856,370 B2 | 12/2010 | Katta et al. |
| 7,978,083 B2 | 7/2011 | Melker et al. |
| 7,984,384 B2 | 7/2011 | Chaudhri et al. |
| 7,986,323 B2 | 7/2011 | Kobayashi et al. |
| 8,024,666 B2 | 9/2011 | Thompson |
| 8,086,047 B2 | 12/2011 | Penke et al. |
| 8,099,178 B2 | 1/2012 | Mairs et al. |
| 8,151,280 B2 | 4/2012 | Sather et al. |
| 8,176,095 B2 | 5/2012 | Murray et al. |
| 8,218,871 B2 | 7/2012 | Angell et al. |
| 8,219,660 B2 | 7/2012 | McCoy et al. |
| 8,271,941 B2 | 9/2012 | Zhang et al. |
| 8,294,585 B2 | 10/2012 | Barnhill |
| 8,302,020 B2 | 10/2012 | Louch et al. |
| 8,320,634 B2 | 11/2012 | Deutsch |
| 8,334,422 B2 | 12/2012 | Gutsol et al. |
| 8,344,893 B1 | 1/2013 | Drammeh |
| 8,375,118 B2 | 2/2013 | Hao et al. |
| 8,476,590 B2 | 7/2013 | Stratmann et al. |
| 8,516,016 B2 | 8/2013 | Park et al. |
| 8,558,660 B2 | 10/2013 | Nix et al. |
| 8,639,527 B2 | 1/2014 | Rensvold et al. |
| 8,698,637 B2 | 4/2014 | Raichman |
| 8,816,860 B2 | 8/2014 | Ophardt et al. |
| 8,869,027 B2 | 10/2014 | Louch et al. |
| 8,904,497 B2 | 12/2014 | Hsieh |
| 8,936,944 B2 | 1/2015 | Peltz et al. |
| 8,947,437 B2 | 2/2015 | Garr et al. |
| 8,950,019 B2 | 2/2015 | Loberger et al. |
| 9,000,926 B2 | 4/2015 | Hollock et al. |
| 9,030,325 B2 | 5/2015 | Taneff |
| 9,098,738 B2 | 8/2015 | Bilet et al. |
| 9,105,071 B2 | 8/2015 | Fletcher et al. |
| 9,175,356 B2 | 11/2015 | Peltz et al. |
| 9,240,111 B2 | 1/2016 | Scott et al. |
| 9,280,884 B1 | 3/2016 | Schultz et al. |
| 9,292,972 B2 | 3/2016 | Hailemariam et al. |
| 9,311,807 B2 | 4/2016 | Schultz et al. |
| 9,320,662 B2 | 4/2016 | Hayes et al. |
| 9,370,600 B1 | 6/2016 | DuPuis et al. |
| 9,373,242 B1 | 6/2016 | Conrad et al. |
| 9,396,638 B2 | 7/2016 | Wildman et al. |
| 9,406,212 B2 | 8/2016 | De Luca et al. |
| 9,418,535 B1 | 8/2016 | Felch et al. |
| 9,418,536 B1 | 8/2016 | Felch et al. |
| 9,449,219 B2 | 9/2016 | Bilet et al. |
| 9,477,543 B2 | 10/2016 | Henley et al. |
| 9,497,832 B2 | 11/2016 | Verberkt et al. |
| 9,513,364 B2 | 12/2016 | Hall et al. |
| 9,526,380 B2 | 12/2016 | Hamilton et al. |
| 9,526,806 B2 | 12/2016 | Park et al. |
| 9,536,415 B2 | 1/2017 | De Luca et al. |
| 9,558,648 B2 | 1/2017 | Douglas |
| 9,591,267 B2 | 3/2017 | Lipton et al. |
| 9,613,518 B2 | 4/2017 | Dunn et al. |
| 9,618,224 B2 | 4/2017 | Emmons et al. |
| 9,640,059 B2 | 5/2017 | Hyland |
| 9,672,360 B2 | 6/2017 | Barkan |
| 9,710,700 B2 | 7/2017 | Bilet et al. |
| 9,715,242 B2 | 7/2017 | Pillai et al. |
| 9,721,452 B2 | 8/2017 | Felch et al. |
| 9,729,945 B2 | 8/2017 | Schultz et al. |
| 9,784,464 B2 | 10/2017 | Yamamoto et al. |
| 9,843,743 B2 | 12/2017 | Lewis et al. |
| 9,856,634 B2 | 1/2018 | Rodenbeck et al. |
| 9,872,088 B2 | 1/2018 | Fadell et al. |

(56) References Cited

U.S. PATENT DOCUMENTS

| | | |
|---|---|---|
| 9,875,639 B2 | 1/2018 | Bone et al. |
| 9,911,312 B2 | 3/2018 | Wildman et al. |
| 9,940,819 B2 | 4/2018 | Ferniany |
| 9,956,306 B2 | 5/2018 | Brais et al. |
| 9,986,175 B2 | 5/2018 | Frank et al. |
| 10,067,516 B2 * | 9/2018 | Ramagem .......... G05D 23/1902 |
| 10,087,608 B2 | 10/2018 | Dobizl et al. |
| 10,223,894 B2 | 3/2019 | Raichman |
| 10,228,837 B2 | 3/2019 | Hua et al. |
| 10,235,865 B2 | 3/2019 | Thyroff |
| 10,251,610 B2 | 4/2019 | Parthasarathy et al. |
| 10,303,843 B2 | 5/2019 | Bitran et al. |
| 10,332,382 B2 | 6/2019 | Thyroff |
| 10,514,817 B2 | 12/2019 | Hua et al. |
| 10,565,844 B2 | 2/2020 | Pourmohammad et al. |
| 10,602,474 B2 | 3/2020 | Goldstein |
| 10,607,147 B2 | 3/2020 | Raykov et al. |
| 2002/0111698 A1 | 8/2002 | Graziano et al. |
| 2002/0130868 A1 | 9/2002 | Smith |
| 2003/0028269 A1 | 2/2003 | Spriggs et al. |
| 2003/0030637 A1 | 2/2003 | Grinstein et al. |
| 2003/0046862 A1 | 3/2003 | Wolf et al. |
| 2003/0071814 A1 | 4/2003 | Jou et al. |
| 2003/0078677 A1 | 4/2003 | Hull et al. |
| 2003/0083957 A1 | 5/2003 | Olefson |
| 2003/0103075 A1 | 6/2003 | Rosselot |
| 2003/0171851 A1 | 9/2003 | Brickfield et al. |
| 2003/0214400 A1 | 11/2003 | Mizutani et al. |
| 2003/0233432 A1 | 12/2003 | Davis et al. |
| 2004/0001009 A1 | 1/2004 | Winings et al. |
| 2004/0064260 A1 | 4/2004 | Padmanabhan et al. |
| 2004/0143474 A1 | 7/2004 | Haeberle et al. |
| 2004/0153437 A1 | 8/2004 | Buchan |
| 2004/0168115 A1 | 8/2004 | Bauernschmidt et al. |
| 2004/0233192 A1 | 11/2004 | Hopper |
| 2004/0260411 A1 | 12/2004 | Cannon |
| 2005/0010460 A1 | 1/2005 | Mizoguchi et al. |
| 2005/0119767 A1 | 6/2005 | Kiwimagi et al. |
| 2005/0143863 A1 | 6/2005 | Ruane et al. |
| 2005/0267900 A1 | 12/2005 | Ahmed et al. |
| 2006/0004841 A1 | 1/2006 | Heikkonen et al. |
| 2006/0009862 A1 | 1/2006 | Imhof et al. |
| 2006/0017547 A1 | 1/2006 | Buckingham et al. |
| 2006/0020177 A1 | 1/2006 | Seo et al. |
| 2006/0028471 A1 | 2/2006 | Kincaid et al. |
| 2006/0029256 A1 | 2/2006 | Miyoshi et al. |
| 2006/0058900 A1 | 3/2006 | Johanson et al. |
| 2006/0067545 A1 | 3/2006 | Lewis et al. |
| 2006/0067546 A1 | 3/2006 | Lewis et al. |
| 2006/0077255 A1 | 4/2006 | Cheng |
| 2006/0184326 A1 | 8/2006 | McNally et al. |
| 2006/0231568 A1 | 10/2006 | Lynn et al. |
| 2006/0265664 A1 | 11/2006 | Simons et al. |
| 2006/0279630 A1 | 12/2006 | Aggarwal et al. |
| 2007/0016955 A1 | 1/2007 | Goldberg et al. |
| 2007/0055757 A1 | 3/2007 | Mairs et al. |
| 2007/0055760 A1 | 3/2007 | McCoy et al. |
| 2007/0061046 A1 | 3/2007 | Mairs et al. |
| 2007/0067062 A1 | 3/2007 | Mairs et al. |
| 2007/0088534 A1 | 4/2007 | MacArthur et al. |
| 2007/0090951 A1 | 4/2007 | Chan et al. |
| 2007/0091091 A1 | 4/2007 | Gardiner et al. |
| 2007/0101433 A1 | 5/2007 | Louch et al. |
| 2007/0114295 A1 | 5/2007 | Jenkins |
| 2007/0120652 A1 | 5/2007 | Behnke |
| 2007/0139208 A1 | 6/2007 | Kates |
| 2007/0216682 A1 | 9/2007 | Navratil et al. |
| 2007/0219645 A1 | 9/2007 | Thomas et al. |
| 2007/0239484 A1 | 10/2007 | Arond et al. |
| 2007/0268122 A1 | 11/2007 | Kow et al. |
| 2008/0001763 A1 | 1/2008 | Raja et al. |
| 2008/0027885 A1 | 1/2008 | Van Putten et al. |
| 2008/0036593 A1 | 2/2008 | Rose-Pehrsson et al. |
| 2008/0062167 A1 | 3/2008 | Boggs et al. |
| 2008/0099045 A1 | 5/2008 | Glenn et al. |
| 2008/0103798 A1 | 5/2008 | Domenikos et al. |
| 2008/0120396 A1 | 5/2008 | Jayaram et al. |
| 2008/0144885 A1 | 6/2008 | Zucherman et al. |
| 2008/0183424 A1 | 7/2008 | Seem |
| 2008/0194009 A1 | 8/2008 | Marentis |
| 2008/0198231 A1 | 8/2008 | Ozdemir et al. |
| 2008/0209342 A1 | 8/2008 | Taylor et al. |
| 2008/0222565 A1 | 9/2008 | Taylor et al. |
| 2008/0224862 A1 | 9/2008 | Cirker |
| 2008/0242945 A1 | 10/2008 | Gugliotti et al. |
| 2008/0250800 A1 | 10/2008 | Wetzel |
| 2008/0279420 A1 | 11/2008 | Masticola et al. |
| 2008/0280275 A1 | 11/2008 | Collopy |
| 2008/0303658 A1 | 12/2008 | Melker et al. |
| 2008/0306985 A1 | 12/2008 | Murray et al. |
| 2008/0320552 A1 | 12/2008 | Kumar et al. |
| 2009/0001181 A1 | 1/2009 | Siddaramanna et al. |
| 2009/0024944 A1 | 1/2009 | Louch et al. |
| 2009/0065596 A1 | 3/2009 | Seem et al. |
| 2009/0083120 A1 | 3/2009 | Strichman et al. |
| 2009/0096791 A1 | 4/2009 | Abshear et al. |
| 2009/0125337 A1 | 5/2009 | Abri |
| 2009/0125825 A1 | 5/2009 | Rye et al. |
| 2009/0144023 A1 | 6/2009 | Seem |
| 2009/0157744 A1 | 6/2009 | McConnell |
| 2009/0160673 A1 | 6/2009 | Cirker |
| 2009/0322782 A1 | 12/2009 | Kimchi et al. |
| 2010/0048167 A1 | 2/2010 | Chow et al. |
| 2010/0058248 A1 | 3/2010 | Park |
| 2010/0064001 A1 | 3/2010 | Daily |
| 2010/0070089 A1 | 3/2010 | Harrod et al. |
| 2010/0073162 A1 | 3/2010 | Johnson et al. |
| 2010/0123560 A1 | 5/2010 | Nix et al. |
| 2010/0134296 A1 | 6/2010 | Hwang |
| 2010/0156628 A1 | 6/2010 | Ainsbury et al. |
| 2010/0156630 A1 | 6/2010 | Ainsbury |
| 2010/0188228 A1 | 7/2010 | Hyland |
| 2010/0223198 A1 | 9/2010 | Noureldin et al. |
| 2010/0249955 A1 | 9/2010 | Sitton |
| 2010/0286937 A1 | 11/2010 | Hedley et al. |
| 2010/0318200 A1 | 12/2010 | Foslien et al. |
| 2010/0324962 A1 | 12/2010 | Nesler et al. |
| 2011/0010654 A1 | 1/2011 | Raymond et al. |
| 2011/0057799 A1 | 3/2011 | Taneff |
| 2011/0077779 A1 | 3/2011 | Fuller et al. |
| 2011/0083094 A1 | 4/2011 | Laycock et al. |
| 2011/0087988 A1 | 4/2011 | Ray et al. |
| 2011/0112854 A1 | 5/2011 | Koch et al. |
| 2011/0126111 A1 | 5/2011 | Gill et al. |
| 2011/0154426 A1 | 6/2011 | Doser et al. |
| 2011/0161124 A1 | 6/2011 | Lappinga et al. |
| 2011/0169646 A1 | 7/2011 | Raichman |
| 2011/0184563 A1 | 7/2011 | Foslien et al. |
| 2011/0202467 A1 | 8/2011 | Hilber et al. |
| 2011/0273298 A1 | 11/2011 | Snodgrass et al. |
| 2011/0291841 A1 | 12/2011 | Hollock et al. |
| 2011/0298301 A1 | 12/2011 | Wong et al. |
| 2011/0316703 A1 | 12/2011 | Butler et al. |
| 2011/0320054 A1 | 12/2011 | Brzezowski |
| 2012/0022700 A1 | 1/2012 | Drees et al. |
| 2012/0039503 A1 | 2/2012 | Chen et al. |
| 2012/0062382 A1 | 3/2012 | Taneff |
| 2012/0075464 A1 | 3/2012 | Derenne et al. |
| 2012/0109988 A1 | 5/2012 | Li et al. |
| 2012/0112883 A1 | 5/2012 | Wallace et al. |
| 2012/0131217 A1 | 5/2012 | Delorme et al. |
| 2012/0158185 A1 | 6/2012 | El-Mankabady et al. |
| 2012/0216243 A1 | 8/2012 | Gill et al. |
| 2012/0224057 A1 | 9/2012 | Gill et al. |
| 2012/0259466 A1 | 10/2012 | Ray et al. |
| 2012/0262472 A1 | 10/2012 | Garr et al. |
| 2012/0272146 A1 | 10/2012 | D'souza et al. |
| 2012/0291068 A1 | 11/2012 | Khushoo et al. |
| 2012/0303652 A1 | 11/2012 | Tseng |
| 2012/0310418 A1 | 12/2012 | Harrod et al. |
| 2013/0055132 A1 | 2/2013 | Foslien |
| 2013/0060794 A1 | 3/2013 | Puttabasappa et al. |
| 2013/0082842 A1 | 4/2013 | Balazs et al. |
| 2013/0086152 A1 | 4/2013 | Hersche et al. |

(56) References Cited

U.S. PATENT DOCUMENTS

| | | |
|---|---|---|
| 2013/0091631 A1 | 4/2013 | Hayes et al. |
| 2013/0110295 A1 | 5/2013 | Zheng et al. |
| 2013/0169681 A1 | 7/2013 | Rasane et al. |
| 2013/0184880 A1 | 7/2013 | McMahon |
| 2013/0187775 A1 | 7/2013 | Marsden et al. |
| 2013/0204570 A1 | 8/2013 | Mendelson et al. |
| 2013/0229276 A1 | 9/2013 | Hunter |
| 2013/0268293 A1 | 10/2013 | Knudson et al. |
| 2013/0289774 A1 | 10/2013 | Day et al. |
| 2014/0032157 A1 | 1/2014 | Khiani |
| 2014/0040998 A1 | 2/2014 | Hsieh |
| 2014/0046490 A1 | 2/2014 | Foslien et al. |
| 2014/0046722 A1 | 2/2014 | Rosenbloom et al. |
| 2014/0058539 A1 | 2/2014 | Park |
| 2014/0167917 A2 | 6/2014 | Wallace et al. |
| 2014/0207291 A1 | 7/2014 | Golden et al. |
| 2014/0292518 A1 | 10/2014 | Wildman et al. |
| 2014/0307076 A1 | 10/2014 | Deutsch |
| 2014/0309757 A1 | 10/2014 | Le Sant et al. |
| 2014/0316582 A1 | 10/2014 | Berg-Sonne et al. |
| 2014/0320289 A1 | 10/2014 | Raichman |
| 2014/0342724 A1 | 11/2014 | Hill et al. |
| 2015/0025329 A1 | 1/2015 | Amarasingham et al. |
| 2015/0032264 A1 | 1/2015 | Emmons et al. |
| 2015/0056909 A1 | 2/2015 | Chien |
| 2015/0070174 A1 | 3/2015 | Douglas |
| 2015/0077258 A1 | 3/2015 | Nelson et al. |
| 2015/0113462 A1 | 4/2015 | Chen et al. |
| 2015/0153918 A1 | 6/2015 | Chen et al. |
| 2015/0161874 A1 | 6/2015 | Thyroff et al. |
| 2015/0167995 A1 | 6/2015 | Fadell et al. |
| 2015/0168949 A1 | 6/2015 | Hua et al. |
| 2015/0194043 A1 | 7/2015 | Dunn et al. |
| 2015/0198707 A1 | 7/2015 | Al-Alusi |
| 2015/0212717 A1 | 7/2015 | Nair et al. |
| 2015/0213222 A1 | 7/2015 | Amarasingham et al. |
| 2015/0213379 A1 | 7/2015 | Nair et al. |
| 2015/0216369 A1 | 8/2015 | Hamilton et al. |
| 2015/0253748 A1 | 9/2015 | Brun et al. |
| 2015/0281287 A1 | 10/2015 | Gill et al. |
| 2016/0061476 A1 | 3/2016 | Schultz et al. |
| 2016/0061477 A1 | 3/2016 | Schultz et al. |
| 2016/0061794 A1 | 3/2016 | Schultz et al. |
| 2016/0061795 A1 | 3/2016 | Schultz et al. |
| 2016/0063833 A1 | 3/2016 | Schultz et al. |
| 2016/0066067 A1 | 3/2016 | Schultz et al. |
| 2016/0116181 A1 | 4/2016 | Aultman et al. |
| 2016/0139067 A1 | 5/2016 | Grace |
| 2016/0170998 A1* | 6/2016 | Frank ............... H04W 4/021 707/748 |
| 2016/0253897 A1 | 9/2016 | Wildman et al. |
| 2016/0255516 A1 | 9/2016 | Hill et al. |
| 2016/0298864 A1 | 10/2016 | Ekolind et al. |
| 2016/0306934 A1 | 10/2016 | Sperry et al. |
| 2016/0314683 A1 | 10/2016 | Felch et al. |
| 2016/0328948 A1 | 11/2016 | Ferniany |
| 2016/0335731 A1 | 11/2016 | Hall |
| 2016/0367925 A1 | 12/2016 | Blackley |
| 2017/0004286 A1* | 1/2017 | Gould ............... H04L 61/103 |
| 2017/0024986 A1 | 1/2017 | Austin |
| 2017/0193792 A1 | 7/2017 | Bermudez Rodriguez et al. |
| 2017/0256155 A1 | 9/2017 | Sengstaken, Jr. |
| 2017/0280949 A1 | 10/2017 | Wildman et al. |
| 2017/0294106 A1 | 10/2017 | Thyroff |
| 2017/0365024 A1 | 12/2017 | Koch et al. |
| 2018/0016773 A1 | 1/2018 | Chandler et al. |
| 2018/0151054 A1 | 5/2018 | Pi |
| 2018/0218591 A1 | 8/2018 | Easter |
| 2018/0293038 A1 | 10/2018 | Meruva et al. |
| 2018/0301014 A1 | 10/2018 | Worral et al. |
| 2018/0313695 A1 | 11/2018 | Shim et al. |
| 2018/0365957 A1 | 12/2018 | Wright et al. |
| 2019/0049139 A1* | 2/2019 | Ko ..................... H05B 47/115 |
| 2019/0051138 A1 | 2/2019 | Easter |
| 2019/0139395 A1 | 5/2019 | Rogachev et al. |
| 2019/0209719 A1 | 7/2019 | Andersen et al. |
| 2019/0257545 A1* | 8/2019 | Ko ..................... F24F 11/56 |
| 2020/0009280 A1 | 1/2020 | Kupa et al. |
| 2020/0074836 A1 | 3/2020 | Kolavennu et al. |
| 2020/0090089 A1 | 3/2020 | Aston et al. |
| 2020/0146557 A1 | 5/2020 | Cheung et al. |
| 2020/0200420 A1 | 6/2020 | Nayak et al. |

FOREIGN PATENT DOCUMENTS

| | | |
|---|---|---|
| CN | 103110410 A | 5/2013 |
| CN | 103970977 A | 8/2014 |
| CN | 105116848 A | 12/2015 |
| CN | 108961714 A | 12/2018 |
| CN | 110009245 A | 7/2019 |
| CN | 110084928 A | 8/2019 |
| CN | 110827457 A | 2/2020 |
| EP | 1669912 A1 | 6/2006 |
| EP | 2310981 A1 | 4/2011 |
| JP | 7085166 A | 3/1995 |
| JP | 11024735 A | 1/1999 |
| JP | 11317936 A | 11/1999 |
| JP | 2001356813 A | 12/2001 |
| JP | 2005242531 A | 9/2005 |
| JP | 2005311563 A | 11/2005 |
| KR | 1172747 B1 | 8/2012 |
| KR | 101445367 B1 | 10/2014 |
| KR | 1499081 B1 | 3/2015 |
| WO | 9621264 A3 | 11/1996 |
| WO | 2004029518 A1 | 4/2004 |
| WO | 2005045715 A2 | 5/2005 |
| WO | 2008152433 A1 | 12/2008 |
| WO | 2008157755 A1 | 12/2008 |
| WO | 2009012319 A2 | 1/2009 |
| WO | 2009079648 A1 | 6/2009 |
| WO | 2010106474 A1 | 9/2010 |
| WO | 2011025085 A1 | 3/2011 |
| WO | 2011043732 A1 | 4/2011 |
| WO | 2011057173 A2 | 5/2011 |
| WO | 2011123743 A1 | 10/2011 |
| WO | 2013062725 A1 | 5/2013 |
| WO | 2013178819 A1 | 12/2013 |
| WO | 2014009291 A1 | 1/2014 |
| WO | 2014098861 A1 | 6/2014 |
| WO | 2014135517 A1 | 9/2014 |
| WO | 2016123536 A1 | 8/2016 |
| WO | 2017057274 A1 | 4/2017 |
| WO | 2019046580 A1 | 3/2019 |
| WO | WO-2019143735 A1 * | 7/2019 ............. A61L 9/015 |
| WO | 2020024553 A1 | 2/2020 |

OTHER PUBLICATIONS

Juliana Bocicor et al. "Wireless Sensor Network based System for the Prevention of Hospital Acquired Infections", arxiv.org, Cornell University Ithaca, NY 14853, May 2, 2017, XP080947042, (Abstract).

Shhedi Zaid Ali et al., "Traditional and ICT Solutions for Preventing the Hospital Acquired Infection", 2015 20th International Conference on Control Systems and Computer Science, IEEE, May 27, 2015, pp. 867-873, XP033188038.

Extended European Search Report, EP application No. 20151295.1, pp. 13, May 26, 2020.

U.S. Appl. No. 14/109,496, filed Dec. 17, 2013.

www.geappliances.com/home-energy-manager/about-energy-monitors.htm, "Energy Monitor, Home Energy Monitors, GE Nucleus," 2 pages, printed Jan. 15, 2013.

www.luciddesigngroup.com/network/apps.php#/homepage, "Lucid Design Group—Building Dashboard Network—Apps," 7 pages, Jan. 15, 2013.

Preuveneers et al., "Intelligent Widgets for Intuitive Interaction and Coordination in Smart Home Environments," IEEE Eighth International Conference on Intelligent Environments, pp. 157-164, 2012.

Wu et al., "A Web 2.0 Based Scientific Application Framework," 7 pages, prior to Jul. 24, 2014.

(56) References Cited

OTHER PUBLICATIONS

"4.0 Today's Activities, The Home Dashboard," CRBM info@hand website, 46 pages, prior to Apr. 25, 2013.
"Free Facilities Dashboards," eSight Energy Website, 2 pages, prior to Apr. 25, 2013.
Alerton Building Controls, Gallery Prints, 7 pages, Dec. 19, 2013.
Carter, "Industrial Energy Management Dashboards Require a Toolkit," Cross Automation, 11 pages, Nov. 4, 2013.
U.S. Appl. No. 14/169,071, filed Jan. 30, 2014.
U.S. Appl. No. 14/169,083, filed Jan. 30, 2014.
U.S. Appl. No. 14/461,188, filed Aug. 15, 2014.
U.S. Appl. No. 14/482,607, filed Sep. 10, 2014.
e-homecontrols.com, "e-Home Controls Website," link to actual website no longer works, 1 page, prior to Dec. 19, 2013.
http://www.ccbac.com, "C&C (/)—Omniboard," 5 pages, Dec. 19, 2013.
http://www.domcontroller.com/en/, "DomController Home Automation Software—Control Anything from Anywhere," 11 pages, printed Jan. 6, 2015.
http://www.novar.com/ems-bas/opus-building-automation-system, "Novar OPUS BAS," 1 page, prior to Feb. 13, 2013.
Instituto Superior Tecnico, "A 3D Interactive Environment for Automated Building Control," Master's Dissertation, 120 pages, Nov. 2012.
Panduit Corp., "Enable a Building Automation with Panduit Enterprise Solutions," 4 pages, Nov. 2012.
"WEBs-AX Web-Enabled Building Solutions," sales brochure, Honeywell International Inc., Mar. 2009.
"Attune Advisory Services," press release, Honeywell International Inc., Mar. 20, 2012.
EnteliWEB product from Delta Controls, web pages retrieved on May 9, 2013 from http://deltacontrols.com/products/facilities-management/supervisory-software et seq. by the Internet Archive at web.archive.org.
"BACnet Protocol Implementation Conformance Statement" for enteliWEB, Delta Controls, Jul. 17, 2013.
Castle, "7 Software Platforms that Make Building Energy Management Easy," http://greentechadvocates.com/2012/11/28/7-software-platforms-that-make-building-energy-managment-easy/, Nov. 28, 2012.
EnteliWEB catalog sheet, Delta Controls, Inc., 2012.
EnteliWEB catalog sheet, Delta Controls., 2010.
"Intelligent Building Management Systems in Miami," Advanced Control Corp., Mar. 7, 2013.
"The Ohio State University," BACnet International Journal, vol. 5, p. 4, Jan. 2013.
Bobker et al., "Operational Effectiveness in Use of BAS," Proceedings of the 13th International Conference for Enhanced Building Operations, Oct. 8, 2013.
Castelo, "A 3D Interactive Environment for Automated Building Control," Elsevier, Nov. 8, 2012.
"Creston Special Report: How Intelligent building management solutions are reducing operational costs," Creston, 2012.
"Building Automation Software Solutions," Iconics, 2013.
Lacey, "The Top 10 Software Vendors Connecting Smart Buildings to the Smart Grid," http://www.greentechmedia.com/articles/read/the-top-10-companies-in-enterprise-smart-grid, Jul. 18, 2013.
"NiagraAX Product Model Overview," Tridium, Inc., 2005.
"An Overview of NiagraAX: A comprehensive software platform designed to create smart device applications, " Tridium, Inc., 2005.
"Phoenix Controls Portal," Phoenix Controls, Inc., 2013.
Quirk, "A Brief History of BIM," Arch Daily, Dec. 7, 2012.
Samad et al., "Leveraging the Web: A Universal Framework for Building Automation," Proceedings of the 2007 American Control Conference, Jul. 11, 2007.
Sinha et al., "9 Key attributes of energy dashboards and analytics tools," https://www.greenbiz.com/blog/2013/08/28/9-key-attributes-energy-dashboards-and=analytics-tools, Aug. 28, 2013.
Sinopoli, "Dashboards For Buildings," http://www//automatedbuildings.com/news/dec10/articles/sinopoli/101119034404sinopoli.html, Dec. 2010.
Sinopoli, "Modeling Building Automation and Control Systems," http://www.automatedbuildings.com/news/jun13/articles/sinopoli/130521122303sinopoli.html, Jun. 2013.
Zito, "What is Tridium Part 1," http://blog.buildingautomationmonthly.com/what-is-tridium/, May 12, 2013.
Zito, "What is Tridium Part 2," http://blog.buildingautomationmonthly.com/tridium-part-2/, Sep. 10, 2013.
Search Report and Written Opinion from related International PCT Application No. PCT/US2018/025189 dated Jul. 17, 2018 (12 pages).
"Data analytics and smart buildings increase comfort and energy efficiency", https://www.microsoft.com/itshowcase/Article/Content/845/Data-analytics-and-smart-buildings-increase-comfort-and-energy-efficiency, Dec. 19, 2016, 8 pages.
Donnelly, "Building Energy Management: Using Data as a Tool", http://www.buildingefficiencyinitiative.org/sites/default/files/legacy/InstituteBE/media/Library/Resources/Existing-Building-Retrofits/Using-Building-Data-as-a-Tool.pdf, Oct. 2012, 9 pages.
"ASHRAE Dashboard Research Project," 29 pages, Aug. 28, 2008.
"Energy Manager User Guide," Release 3.2, Honeywell, 180 pages, 2008.
"Fuzzy Logic Toolbox 2.1, Design and Stimulate Fuzzy Logic Systems," The MathWorks, 2 pages, May 2004.
"Junk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
Honeywell, "Product Guide 2004," XP-002472407, 127 pages, 2004.
"Statistics Toolbox, for Use with Matlab," User's Guide Version2, The MathWorks, 408 pages, Jan. 1999.
"Vykon Energy Suite Student Guide," Tridium Inc., 307 pages, Mar. 3, 2006.
"Web Based Energy Information Systems for Energy Management and Demand Response in Commercial Buildings," California Energy Commission, 80 pages, Oct. 2003.
Andover Controls, Network News, vol. 2, No. 2, 8 pages, 1997.
Andover Controls World, 4 pages, Spring 1997.
Bell, Michael B. et al., "Early Event Detection-Results from A Prototype Implementation," AICHE Spring National Meeting, 15 pages, Apr. 2005.
Cadgraphics, "The CADGRAPHICS User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Chen, Tony. F., "Rank Revealing QR Factorizations," Linear Algebra and It's Applications, vol. 88-89, p. 67-82, Apr. 1987.
Circon, "i-Browse Web-Based Monitoring and Control for Facility Management," 2 pages, prior to Aug. 27, 2007.
Published Australian Application 2009904740, 28 pages, Application Filed on Sep. 29, 2009.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.
Honeywell News Release, "Honeywell's New Sysnet Facilities Integration System for Boiler Plant and Combustion Safety Processes," 4 pages, Dec. 15, 1995.

(56) References Cited

OTHER PUBLICATIONS

Honeywell, "Excel Building Supervisor-Integrated R7044 and FS90 Ver. 2.0," Operator Manual, 70 pages, Apr. 1995.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
http://pueblo.lbl.gov/~olken . . . , "Remote Building Monitoring and Operations Home Page," 5 pages, prior to Aug. 27, 2007.
http://www.commercial.carrier.com/commercial/hvac/productdescription . . . , "Carrier: i-Vu CCN," 1 page, printed Mar. 11, 2008.
http://www.commercial.carrier.com/commercial/hvac/productdescription . . . , "Carrier: 33CSCCNWEB-01 CCN Web Internet Connection to the Carrier Comfort Network," 1 page, printed Mar. 11, 2008.
http://www.docs.hvacpartners.com/idc/groups/public/documents/techlit/gs-controls-ivuccn.rtf, "Products," 5 pages, printed Jul. 3, 2007.
http://www.lightstat.com/products/istat.asp, Lightstat Incorporated, "Internet Programmable Communicating Thermostats," 1 page, printed Mar. 13, 2007.
http://www.sharpsystems.com/products/pc_notebooks/actius/rd/3d/, "Actius RD3D Desktop Replacement Notebook with Industry-Breakthrough 3D Screen," Sharp, 1 page, printed Jun. 16, 2005.
http://www2.sims.berkeley.edu/courses/is213/s06/projects/lightson;final.html, "Lights On A Wireless Lighting Control System," 11 pages, printed Mar. 22, 2007.
I.Lon 100e3 Internet Server, 1 page, prior to Aug. 27, 2007.
I.Lon, SmartServer, 2 pages, prior to Aug. 27, 2007.
I-stat, Demo Screen Shots, 9 pages, printed Mar. 13, 2007.
I-stat, The Internet Programmable Thermostat, 2 pages, prior to Aug. 27, 2007.
Jeffrey Ball, "Green Goal of 'Carbon Neutrality' Hits Limit," TheWall Street Journal, 7 pages, Dec. 30, 2008.
Johnson Controls, Network Integration Engine (NIE) 3 pages, Nov. 9, 2007.
Johnson Controls, Network Integration Engine (NIE), Product Bulletin, pp. 1-11, Jan. 30, 2008.
Kourti, Theodora, "Process Analysis and Abnormal Situation Detection: From Theory to Practice," IEEE Control Systems Magazine, p. 10-25, Oct. 2002.
Mathew, Paul A., "Action-Oriented Benchmarking, Using CEUS Date to Identify and Prioritize Efficiency Opportunities In California Commercial Buildings," 26 pages, Jun. 2007.
Morrison, Don et al., "The Early Event Detection Toolkit," Honeywell Process Solutions, 14 pages, Jan. 2006.
Narang, "WEBARC: Control and Monitoring of Building Systems Over the Web," 53 pages, May 1999.
Hertzfeld Esther: "Honeywell upgrades Inncontrol 5 | Hotel Management", Jan. 9, 2020, XP055865557, Retrieved from the Internet: URL:https://www.hotelmanagement.net/tech/honeywell-upgrades-inncontrol-5# [retrieved on Nov. 24, 2021] (4 pages).
Extended European Search Report, EP Application No. 21186826.0, Dec. 16, 2021 (9 pages).
Olken et al., "Object Lessons Learned from a Distributed System for Remote Building Monitoring and Operation," ACM SIGPLAN Notices, vol. 33, No. 10, pp. 284-295, Oct. 1998.
Proliphix, Inc., "Proliphix IP Devices: HTTP API," 28 pages, Jan. 23, 2006.
Proliphix, Inc., Remote Management User Guide, 12 pages, prior to Aug. 27, 2007.
Richard Rogan et al., "Smart and Final Food Stores: A Case Study in Web Based Energy Information and Collection," Web Based Energy Information and Control Systems: Case Studies and Application, Chapter 6, p. 59-64, 2005.
Sharp, "Actius AL3DU 3D LC Display High Performance 3D Visualization," 2 pages, prior to Mar. 17, 2006.
So et al., "Building Automation on the Information Superhighway," ASHRAE (American Society of Heating Refrigerating, and Air Conditioning) Transactions, vol. 104, Part 2, pp. 176-191, 1998.
So et al., "Building Automation Systems on the Internet," Facilities vol. 15, No. 5/6, pp. 125-133, May/Jun. 1997.
Talon, "Raptor Controller," 6 pages, Oct. 2003.
Talon, "Workstation Software," 4 pages, Nov. 2002.
Trane, "System Programming, Tracer Summit Version 14, BMTW-SVP01D-EN," 623 pages, 2002.
Lucid Design Group, Inc., "Building Dashboard," 2 pages, Printed May 30, 2013.
"America's Largest Managed Security Services Provider Launches Comprehensive, Integrated Covid-19 Safety Program for Office Buildings and Suites," KastleSafeSpaces, 5 pages, May 11, 2020.
"Biometric Door Reader With Body Temperature Detection," Kintronics, 9 pages, accessed May 21, 2020.
"Body Surface Temperature Screening with Alarm Function TVS-200IS/TVS-500IS," Nippon Avionics Co., 3 pages, accessed May 21, 2020.
"BriefCam announces video analytics innovation for contact tracing, physical distancing, occupancy management and face mask detection," BriefCam LTD, 11 pages, Jun. 5, 2020.
"Thermal Imaging SmartPhone Can Be used For Temperature Screening of People," CAT, 3 pages, accessed Jul. 13, 2020.
"Contact Tracing Now Available on Identiv's Hirsch Velocity Access Control Platform," IDENTIV, 5 pages, May 21, 2020.
Silva et al., "Cough localization for the detection of respiratory diseases in pig houses," ScienceDirect, 7 pages, May 28, 2008.
Dey et al., "Evaluation of Isolation Compliance Using Real Time Video In Critical Care," North Shore University Hospital, 1 page, Oct. 9, 2015.
"Facial Attendace System With Temperature Screening Now In India," IANS, 5 pages, Mar. 19, 2020.
"Plan to Re-Open," EHIGH, 16 pages, accessed Jun. 13, 2020.
"How Smarter AI-Powered Cameras Can Mitigate the Spread of Wuhan Novel," AnyConnect, 22 pages, 2020.
"How to fight COVID-19 with machine learning," DataRevenue, 20 pages, accessed May 25, 2020.
"INNCONTROL 5," Honeywell, 2 pages, Aug. 8, 2018.
"IP Door Access Control," KINTRONICS, 21 pages, 2014.
"Kogniz AI Health Response Platform," KOGNIZ, 9 pages, accessed May 21, 2020.
"Machine Learning Could Check If You're Social Distancing Properly at Work," MIT Technology Review, 7 pages, Apr. 17, 2020.
Punn et al., "Monitoring COVID-19 social distancing with person detection and tracking via fine-tuned YOLO v3 and Deepsort techniques," 10 pages, May 6, 2020.
"NEC launches dual face biometric and fever detection system for access control," Biometric Update, 4 pages, May 8, 2020.
"Remote temperature monitoring," AXIS Communication, 10 pages, 2014.
"FebriEye-AI Based Thermal Temperature Screening System," vehant, 1 page, 2020.
"See The World In A New Way Hikvision Thermal Cameras," Hikvision, 12 pages, 2017.
Allain, "Trying out the iPhone Infrared Camera: The FLIR One," Wired, 15 pages, 2014.
Dasgupta, "Your voice may be able to tell you if you have Covid," Hindustan Times, 4 pages, Apr. 16, 2020.
Ganguty, "Gurugram-based startup Staqu has modified AI-powered JARVIS to battle coronavirus," Yourstory, 7 pages, Mar. 31, 2020.

\* cited by examiner

METHODS AND SYSTEMS FOR DETERMINING GUEST SATISFACTION INCLUDING GUEST SLEEP QUALITY IN HOTELS

TECHNICAL FIELD

The present disclosure relates generally to hotels. More particularly, the present disclosure relates to determining guest sleep quality for guests staying within hotel rooms.

BACKGROUND

Hotels can include a large number of hotel rooms that can be rented out by guests. A primary requirement for many hotel guests is the ability to have a good night sleep. For hotel management, there are not many un-intrusive and data-driven ways of determining whether a guest had a good quality sleep experience. It is also difficult for hotel management to determine whether certain rooms of the hotel are correlated with poor guest sleep quality and to identify possible causes so that corrective action can be taken. What would be desirable is un-intrusive and data-driven way of determining if guests have a good quality sleep experience in the hotel, and if not, to help identify possible causes so that corrective action can be taken.

SUMMARY

The present disclosure relates generally to determining how well individual hotel guests are sleeping, and how that compares to other hotel rooms and/or other hotels. In an example, a system provides for evaluating a hotel guest's satisfaction of a hotel. The system includes one or more sensors within the guest room that are configured to provide data points indicative of guest activities in the guest room. The one or more sensors may be operably coupled to a hotel network within the hotel. A server remote from the guest room is configured to receive the data points from the one or more sensors via a connection to the hotel network and to use the data points to calculate a guest satisfaction score for the guest room. The server is configured to display the guest satisfaction score for the guest room. The guest satisfaction score can be compared to guest satisfaction scores of other hotel rooms and/or other hotels.

In another example, a method of determining a guest sleep quality score for a guest room of a plurality of guest rooms of a hotel facility where each of the plurality of guest rooms include a connected thermostat includes a server receiving an indication that the guest room is occupied as well as receiving a plurality of parameters from one or more sensors within the guest room. The server determines two or more partial guest sleep quality scores based at least in part on one of more of the plurality of parameters that correspond to a predefined time period at night. The server calculates the guest sleep quality score for the guest room by determining a weighted combination of two or more of the partial guest sleep quality scores for times when the guest room is determined to be rented and occupied. The server displays on a display the guest sleep quality score calculated for the guest room.

In another example, a method for evaluating guest sleep quality scores for a plurality of guest rooms within a hotel is provided, The illustrative method includes receiving one or more sensed conditions from one or more sensors located in each of the plurality of guest rooms of the hotel, and determining a guest sleep quality score for each of two or more of the plurality of guest rooms of the hotel. The guest sleep quality score for each of the two or more of the plurality of guest rooms is based at least in part on one or more guest activities determined from the one or more sensed conditions sensed by the one or more sensors in the corresponding guest room. Once determined, the guest sleep quality score for at least some of the two or more of the plurality of guest rooms of the hotel are displayed on a display.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
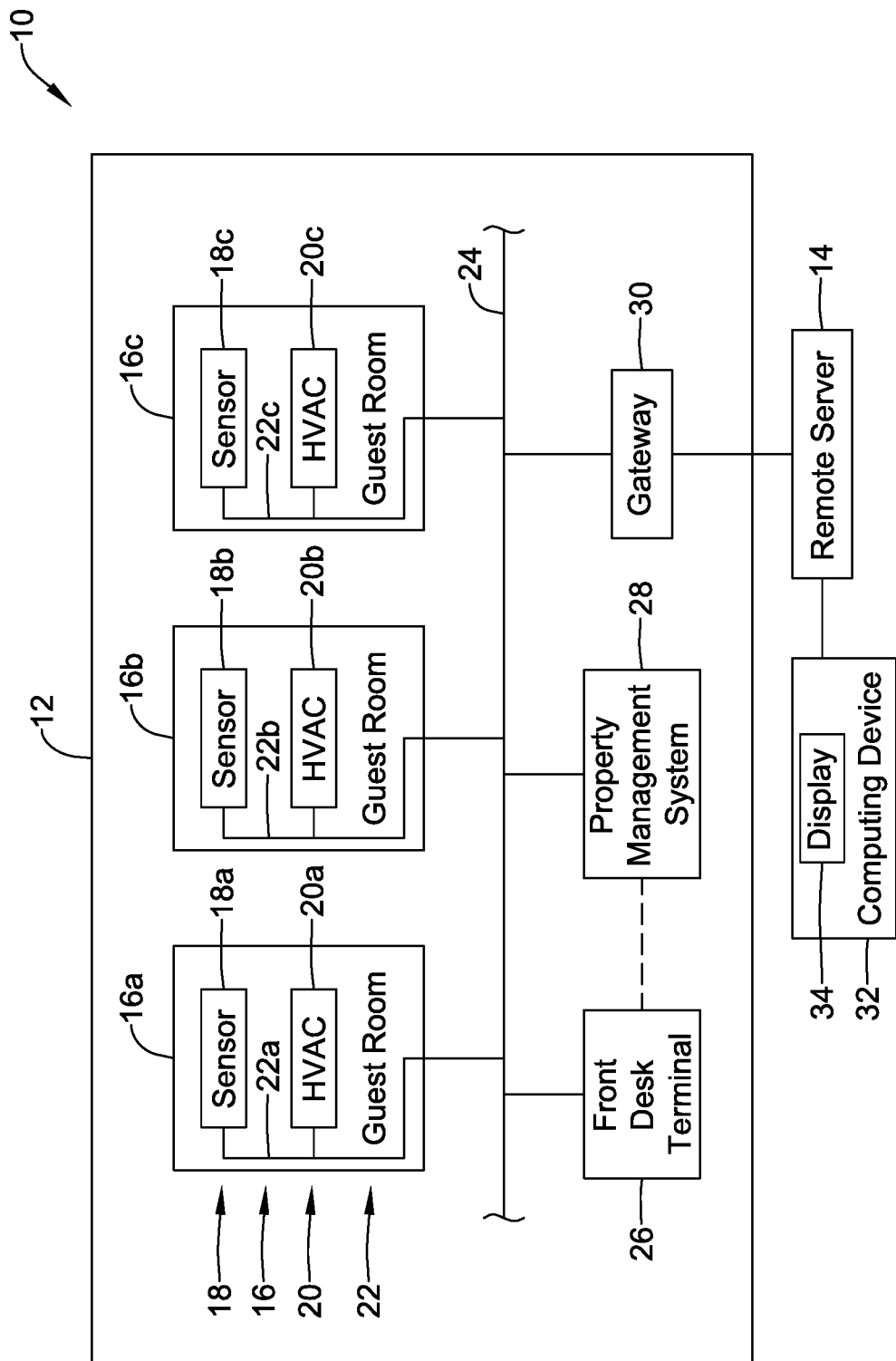
FIG. 1 is a schematic block diagram showing an illustrative hotel management system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative hotel management system 10. The illustrative hotel management system 10 is installed in a hotel 12 and includes a remote server 14 remote from the hotel 12. While the remote server 14 is shown as being exterior to the hotel 12, this is not required in all cases. It is contemplated that the remote server 14 could be disposed within the hotel 12, if desired. The remote server 14 may be a single computer, or the remote server 14 may represent a cloud-based server that includes one or more different computers. The hotel 12 includes a number of guest rooms 16 that are individually labeled as 16a, 16b, 16c. It will be appreciated that this is merely illustrative, as the hotel 12 will typically include a much greater number of guest rooms 16. Each guest room 16 includes one or more sensors 18, although only one sensor 18 is shown per guest room 16. The sensors 18 are individually labeled as 18a, 18b, 18c. The sensors 18 may, for example, be environmental sensors such as temperature sensors, humidity sensors, light sensors, and/or any other suitable sensor. In some cases, one or more of the sensors 18 may be disposed within a room thermostat within at least some of the guest rooms 16. Alternatively, or in addition, the sensors 18 may include occupancy sensors such as PIR sensors, mmWave sensors, motion sensors and/or microphones, for example. Some of the sensors 18 may be part of a security system of the hotel 12.

Some of the sensors 18 may be configured to provide data points indicative of guest activities in the guest room. To help identify a sleep quality score of a guest, at least some of the sensors 18 may be configured to provide data points that include a measure related to a number of interactions with a thermostat in the corresponding guest room 16 that occur during a defined thermostat interaction detection time period at night. The data points may include a measure related to motion detected by a motion sensor in the corresponding guest room 16 that occur during a defined motion detection time period at night. The data points may include a measure related to changes in an ambient light level detected by a light sensor in the corresponding guest room 16 that occur during a defined ambient light level detection time period at night. In some cases, the data points provided by the sensors 18 may include a measure related to a noise detected by a noise detector in the corresponding guest room that occur during a defined noise detection time period at night. In some cases, the thermostat interaction detection time period, the motion detection time period, the ambient light level detection time period and the noise detection time period each include the time period from 2 AM to 3 AM, for example. In some instances, the data points include one or more sleep parameters that are provided by one or more sensors within a bed in the guest room 16. In this case, the sensor 18, or one of multiple sensors 18 within the guest room 16, may be embedded in the guest's bed.

Each of the guest rooms 16 of the hotel 12 includes a heating, ventilating and air conditioning (HVAC) system 20, individually labeled as 20a, 20b, 20c. The HVAC system 20 in each guest room 16 may be any of a variety of different types of HVAC systems, including split systems. In many cases, the HVAC system 20 in each guest room 16 may be configured to provide warm air, cool air and ambient temperature air circulation as needed, in order to maintain a particular temperature set point within the guest room 16. The particular temperature set point may, for example, include a predetermined temperature set point that is determined for all guest rooms 16 within the hotel 12, particularly for times at which a particular guest room 16 is not rented, or for times at which a particular guest room 16 is rented, but is not occupied. At times in which a particular guest room 16 is both rented and occupied, the temperature set point for that particular guest room 16 may ultimately be determined by the guest, interacting with a room thermostat, for example.

Each of the guest rooms 16 may include a room network 22, individually labeled as 22a, 22b, 22c. The room network 22 in each guest room 16 may be operably coupled with the sensor 18 and the HVAC system 20 within that guest room 16. The room network 22 in each guest room 16 may be a wired network, such as an Ethernet network, or the room network 22 in each guest room may be a wireless network. Each of the room networks 22 may be considered as being operably coupled with a hotel network 24. Accordingly, data from each guest room 16 can reach the hotel network 24, and thus can be passed on to other devices. Similarly, instructions or other commands from outside the individual guest rooms 16 may be passed to devices within each guest room 16, such as but not limited to the sensors 18 and the HVAC systems 20.

In some cases, the hotel network 24 is also operably coupled to devices that are exterior to the guest rooms 16. For example, the hotel 12 may include a front desk terminal 26. The front desk terminal 26 may, for example, be configured to allow hotel employees to check guests in and out of the hotel 12. While one front desk terminal 26 is shown, it will be appreciated that many hotels 12 may have more than one front desk terminal 26. In some hotels 12, for example, a guest may be able to check themselves out of their guest room 16 using the television in their room. In such cases, the television may be considered as functioning as a terminal, and may replace some of the functionality of the front desk terminal 26. Accordingly, the television in each guest room 16 may also be operably coupled to the hotel network 24.

The illustrative hotel 12 includes a Property Management System (PMS) 28. The PMS 28 may be considered as including software that tracks which guest rooms 16 are rented and which guest rooms 16 are not rented. The PMS 28 may track other parameters and features as well. For example, the PMS 28 may track movie and game rentals within each of the guest rooms 16, so that these rentals can be accounted for and correctly billed to the appropriate room renters. While the PMS 28 is shown as being operably coupled to the hotel network 24, in some cases the PMS 28 may also be coupled with the front desk terminal 26, as indicated in FIG. 1 via a dashed line between the PMS 28 and the front desk terminal 26.

A gateway 30 may provide a connection between the hotel network 24, and hence the various devices operably coupled to the hotel network 24, and the remote server 14. In some cases, the gateway 30 may be as simple as a modem/router that permits the hotel network 24, and the devices on the hotel network 24, to access wide area networks (WAN) such as but not limited to the Internet. The gateway 30 may be configured to allow software to be downloaded to the gateway 30 from the remote server 14. In some cases, the software downloaded to the gateway 30 may provide the gateway 30 with additional functionality. The software downloaded to the gateway 30 may, for example, assist the gateway 30 in communicating with the individual room networks 22 and/or the individual components such as the sensors 18 and/or the HVAC systems 20 within each of the guest rooms 16. The software downloaded to the gateway 30 may allow the gateway 30 to provide/pass commands to the individual components such as the sensors 18 and/or the HVAC systems 20 if desired.

The illustrative system 10 includes a computing device 32 that is operably coupled to the remote server 14. While shown outside of the hotel 12, in some cases the computing device 32 may instead be disposed within the hotel 12. The computing device 32 allows an individual to access information available on the hotel network 24. In the example shown, the computing device 32 includes a display 34 that may be used to display information. While not illustrated, it will be appreciated that the computing device 32 may also include data entry options such as a keyboard, mouse, trackball and the like. The computing device 32 may be a lap top computer, a desktop computer, a mobile phone, a tablet computer, and/or any other suitable computing device. In some cases, the remote server 14 and the computing device 32 may be one and the same.

In some instances, the remote server 14 may be configured to receive and/or compute one or more room connectivity parameters that provide an indication of network connectivity to one of the guest rooms 16. This may provide, for example, an indication of whether the room network 22 within a particular guest room 16 is operational or not. In some cases, the one or more room connectivity parameters may include a room uptime parameter that provides an indication of how long a particular guest room 16 has been online relative to a given period of time. The one or more room connectivity parameters may include a router uptime parameter that provides an indication of how long the hotel network 24 has been online relative to the given period of time.

The remote server 14 may be configured to receive and/or compute a PMS connectivity parameter that provides an indication of network connectivity to the Property Management System (PMS) 28 of the hotel 12. The PMS connectivity parameter may include a PMS uptime parameter that provides an indication of how long the PMS 28 has been online relative to the given period of time.

In some cases, the remote server 14 is configured to determine an energy score based at least in part on the one or more room connectivity parameters and the PMS connectivity parameter and to display the energy score on a display such as the display 34 of computing device 32. The energy score may be based at least in part on the one or more room connectivity parameters associated with each of the plurality of guest rooms 16. In some cases, the remote server 14 may be configured to display the aggregate energy score for all of the rooms in the hotel 12 in combination with an aggregate energy score for a comparison hotel. In some cases, the remote server 14 may be configured to display an energy score for each guest room 16 in combination with an aggregate energy score for the hotel 12, to show how the particular guest rooms 16 fare relative to the rest of the hotel 12.

In some cases, the system 10 may be configured to evaluate a hotel guest's satisfaction with the hotel 12. The remote server 14 may be configured to receive a data points from the sensors 18 via a connection to the hotel network 24. The remote server 14 may use the data points to calculate a guest satisfaction score for the guest room 16 and to display the guest satisfaction score. The guest satisfaction score may, for example, include a guest sleep quality score. In some cases, the remote server 14 only calculates the guest satisfaction score when the guest room 16 is determined to be occupied. The remote server 14 may be configured to display an aggregate guest satisfaction score in combination with a guest satisfaction score for each of one or more other guest rooms within the hotel.

Figure 2:
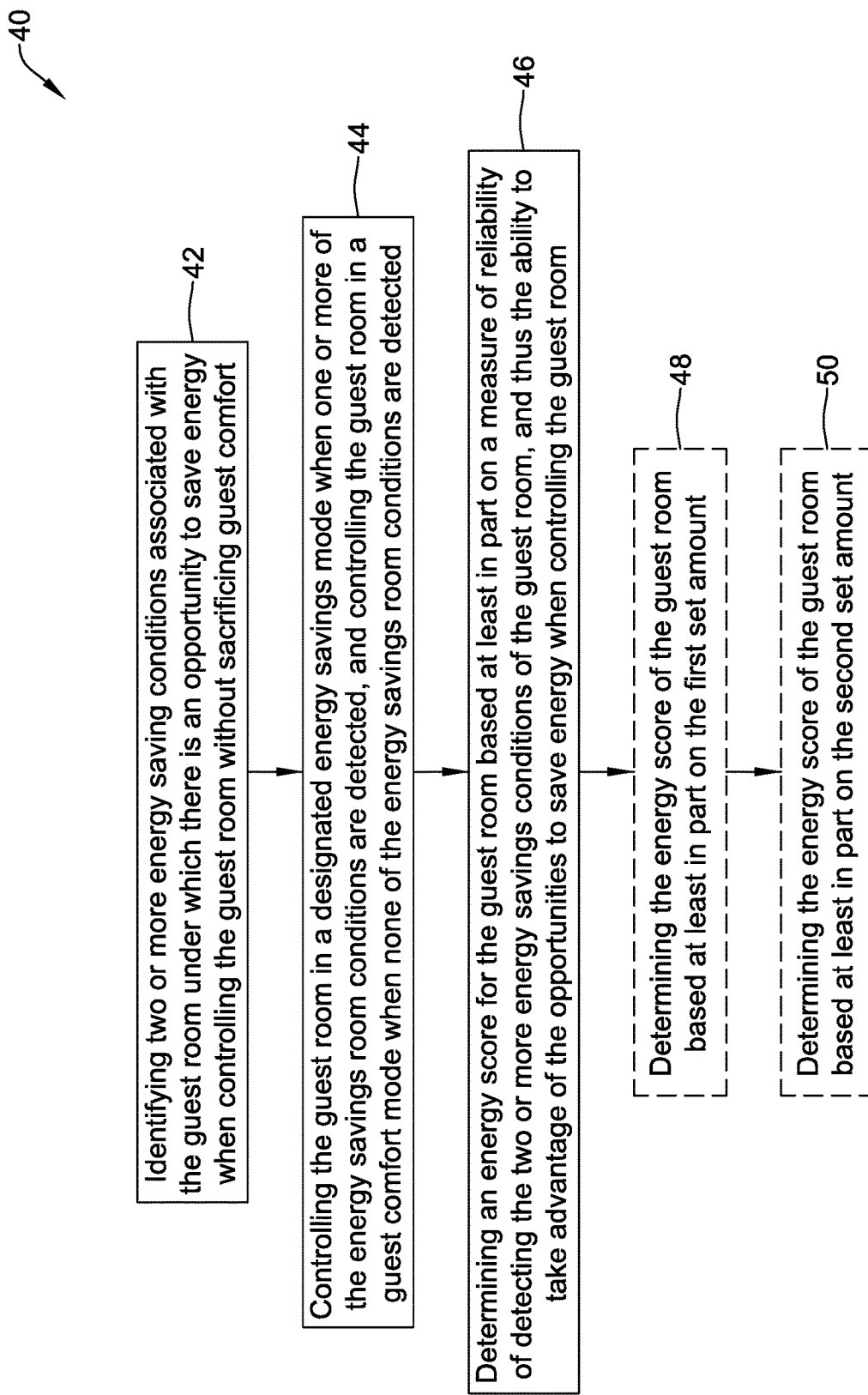
FIG. 2 is a flow diagram showing an illustrative method that may be carried out using the illustrative hotel management system of FIG. 1.

FIG. 2 is a flow diagram showing an illustrative method 40 for determining an energy score for a guest room (such as a guest room 16) of a hotel (such as the hotel 12). Two or more energy saving conditions associated with the guest room under which there is an opportunity to save energy when controlling the guest room without sacrificing guest comfort are identified, as indicated at block 42. In some cases, one of the two or more energy savings conditions includes a guest room rental status of un-rented. One of the two or more energy savings conditions may include a guest room occupancy status of rented but un-occupied. In some cases, a Property Management System (PMS) of the hotel identifies the guest room rental status, and wherein a PMS connectivity parameter representative of a reliability of a connection to the PMS determines at least in part the measure of reliability of detecting the two or more energy savings conditions of the guest room. When an occupancy sensor of the room has failed or is otherwise not providing reliable data, the measure of reliability of detecting the occupancy status of the room may be affected. These are just examples.

The guest room is controlled in a designated energy savings mode when one or more of the energy savings room conditions are detected, and is controlled in a guest comfort mode when none of the energy savings room conditions are detected, as indicated at block 44. An energy score for the guest room is determined based at least in part on a measure of reliability of detecting the two or more energy savings conditions of the guest room, and thus the ability to take advantage of the opportunities to save energy when controlling the guest room, as indicated at block 46.

In some cases, one or more sensors of the guest room may be used to identify the guest room occupancy status, and wherein a room connectivity parameter representative of a reliability of a connection to the guest room determines at least in part the measure of reliability of detecting the two or more energy savings conditions of the guest room. One or more sensors within the guest room may be used to identify the guest room occupancy status, and wherein an occupancy detection parameter representative of a reliability of occupancy detection in the guest room determines at least in part the measure of reliability of detecting the two or more energy savings conditions of the guest room.

In some cases, one of the two or more energy savings conditions includes a guest room rental status of un-rented and another of the two or more energy savings conditions comprises a guest room occupancy status of un-occupied. When a guest room rental status of rented is detected and a guest room occupied status of un-occupied is detected, a first designated energy savings mode is used that deviates from the guest comfort mode by a first set amount. The first set amount may be set by the hotel, and may be a pre-set offset from the guest comfort set point, a fixed temperature value, or any other value suitable for saving energy. In some cases, the first set amount may increase with time such that the guest room temperature is allowed to deviate more as the guest remains away for a longer period of time.

When a guest room rental status of un-rented is detected, a second designated energy savings mode is used that deviates from the guest comfort mode by a second set amount, wherein the second set amount is greater than the first set amount. In some cases, the energy score of the guest room may be based at least in part on the first set amount, as optionally indicated at block 48. The energy score of the guest room may be based at least in part on the second set amount, as optionally indicated at block 50.

The first set amount and the second set amount may be defined when the system 10 is originally configured, for example. In some cases, hotel management may be able to adjust the first set amount and the second set amount, in order to account for seasonal changes, local preferences and the like. As an example, the first set amount may indicate a temperature swing of plus/minus 2 degrees from a temperature set point. The second set amount may indicate a temperature swing of plus/minus 3 degrees, or even plus/minus 4 degrees from the temperature set point. These are just examples.

Figure 3:
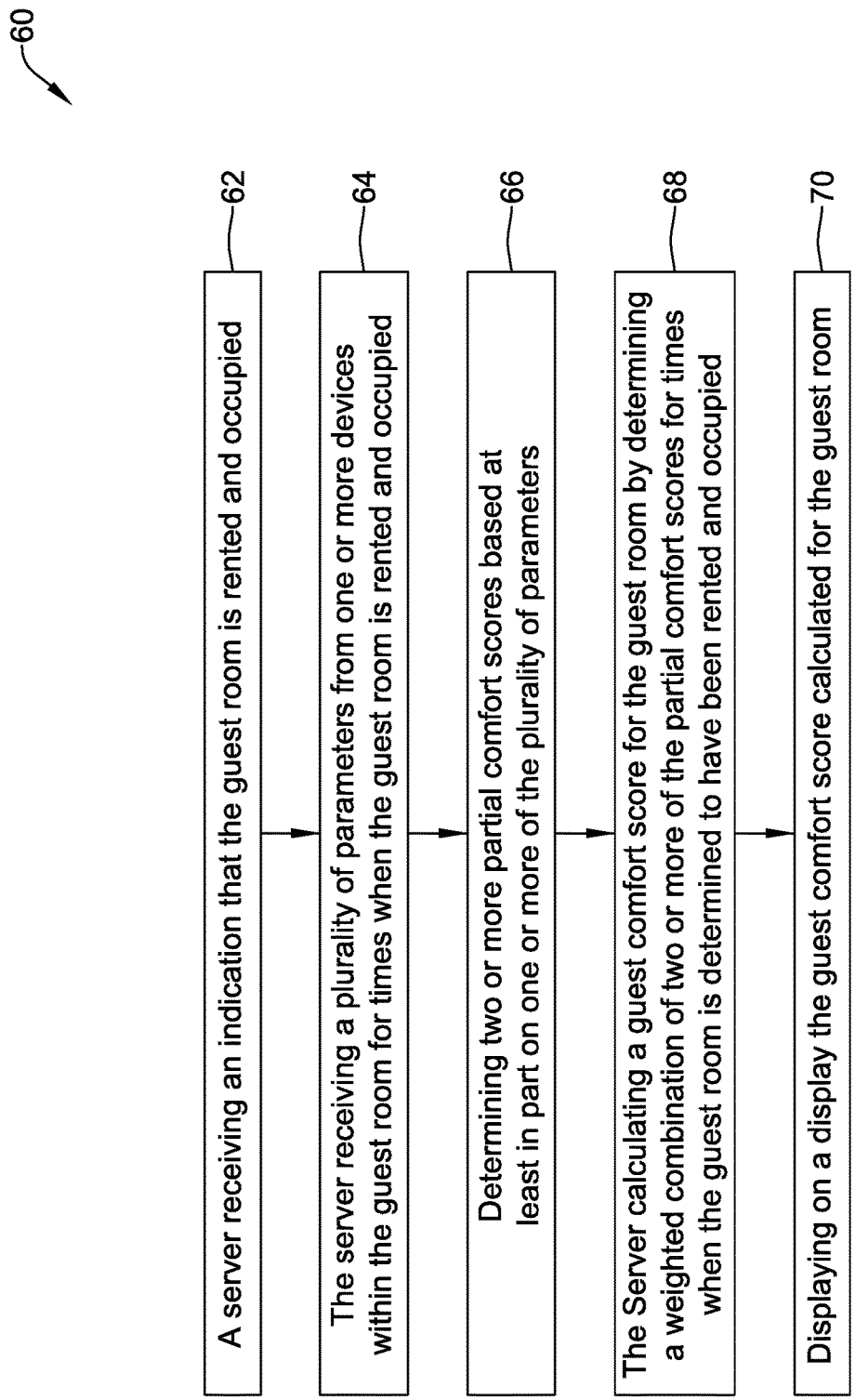
FIG. 3 is a flow diagram showing an illustrative method that may be carried out using the illustrative hotel management system of FIG. 1.

FIG. 3 is a flow diagram showing an illustrative method 60 of determining a guest comfort score for a guest who is staying in a guest room (such as the guest room 16) of a plurality of guest rooms of a hotel facility (such as the hotel 12), where each of the guest rooms include a connected thermostat. A server (such as the remote server 14) receives an indication that the guest room is rented and occupied, as indicated at block 62. The server receives a plurality of parameters from one or more devices within the guest room for times when the guest room is rented and occupied, as indicated at block 64. Two or more partial comfort scores that are based at least in part on one of more of the plurality of parameters are determined, as indicated at block 66. The server calculates a guest comfort score for the guest room by determining a weighted combination of two or more of the partial comfort scores for times when the guest room is determined to have been rented and occupied, as indicated at block 68. The server displays on a display the guest comfort score that was calculated for the guest room, as indicated at block 70.

In some instances, the two or more partial comfort scores may include a partial score that provides a measure of how often an HVAC system of the guest room was unable to achieve a guest selected setpoint within a predefined period of time. The two or more partial scores may include a partial score that provides a measure of how often a guest interacted with a thermostat of the guest room. In some cases, the two or more partial comfort scores include a sleep quality score, wherein the sleep quality score provides a measure of guest activity during a predefined time period at night. The predefined time period at night may be any desired period of time. In some cases, for example, the predefined time period at night may include 2:00 AM-3:00 AM.

Figure 4:
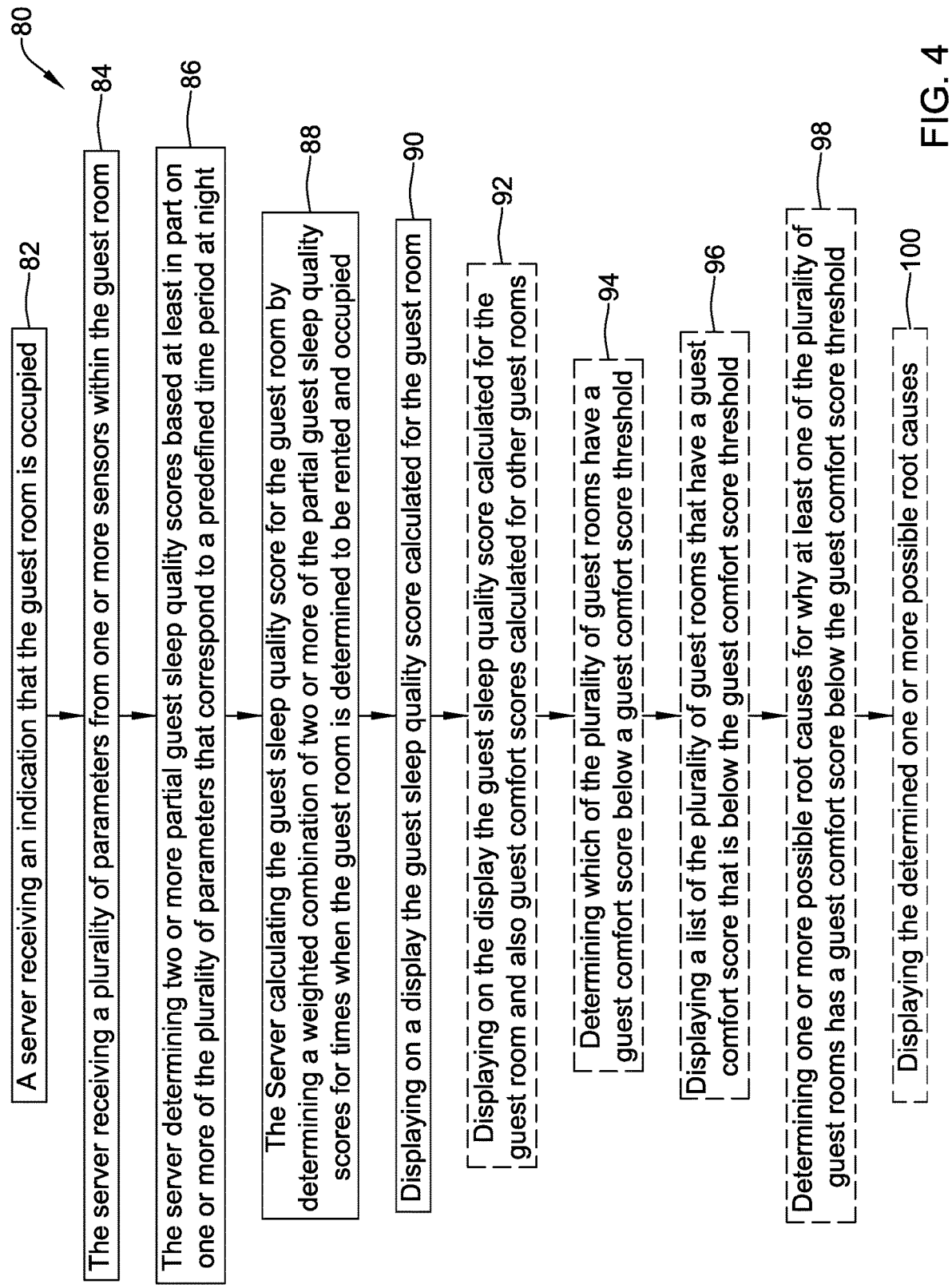
FIG. 4 is a flow diagram showing an illustrative method that may be carried out using the illustrative hotel management system of FIG. 1.

FIG. 4 is a flow diagram showing an illustrative method 80 of determining a guest sleep quality score for a guest room (such as the guest room 16) of a plurality of guest rooms of a hotel facility (such as the hotel 12), where each of the plurality of guest rooms include a connected thermostat. A server receives an indication that the guest room is occupied, as indicated at block 82. The server receives a plurality of parameters from one or more sensors within the guest room, as indicated at block 84. The server determines two or more partial guest sleep quality scores based at least in part on one of more of the plurality of parameters that correspond to a predefined time period at night, as indicated at block 86. The server calculates the guest sleep quality score for the guest room by determining a weighted combination of two or more of the partial guest sleep quality scores for times when the guest room is determined to be rented and occupied, as indicated at block 88. The server displays on a display the guest sleep quality score that was calculated for the guest room, as indicated at block 90. The guest sleep quality score may provide an indication of how well a guest within the guest room slept.

In some cases, the method 80 may further include displaying on the display the guest sleep quality score calculated for the guest room and also guest comfort scores calculated for other guest rooms, as optionally indicated at block 92. The other guest rooms may include others of the plurality of guest rooms of the hotel facility, for example. The method 80 may further include determining which of the plurality of guest rooms have a guest comfort score below a guest comfort score threshold, as indicated at block 94, as well as displaying a list of the plurality of guest rooms that have a guest comfort score that is below the guest comfort score threshold, as indicated at block 96. In some cases, the method 80 may further include determining one or more possible root causes for why at least one of the plurality of guest rooms has a guest comfort score below the guest comfort score threshold, as indicated at block 98, and displaying the determined one or more possible root causes, as indicated at block 100.

Figure 5:
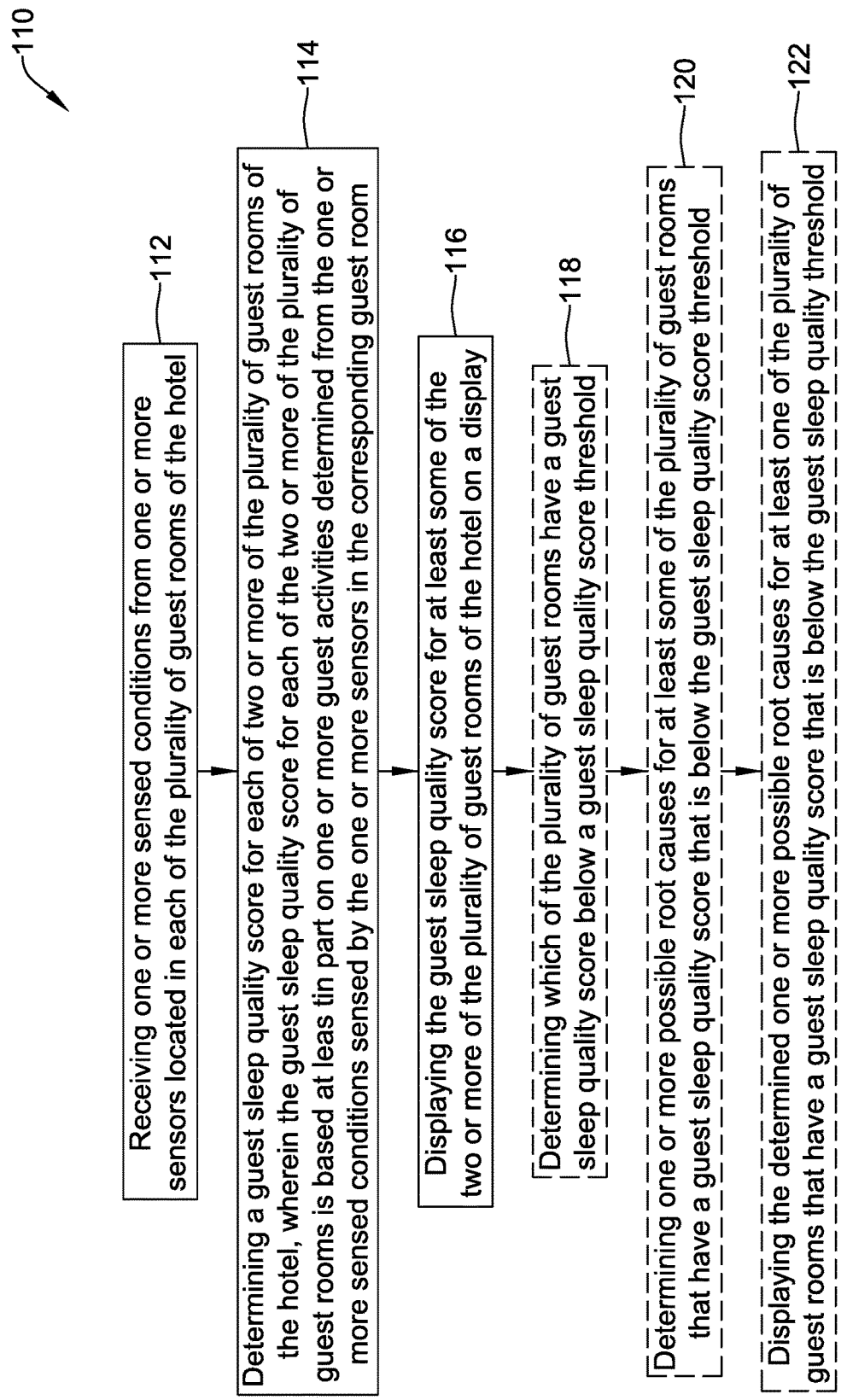
FIG. 5 is a flow diagram showing an illustrative method that may be carried out using the illustrative hotel management system of FIG. 1.

FIG. 5 is a flow diagram showing an illustrative method 110 for evaluating guest sleep quality scores for a plurality of guest rooms (such as the guest room 16) within a hotel (such as the hotel 12). One or more sensed conditions are received from one or more sensors located in each of the plurality of guest rooms of the hotel, as indicated at block 112. A guest sleep quality score is determined for each of two or more of the plurality of guest rooms of the hotel, wherein the guest sleep quality score for each of the two or more of the plurality of guest rooms is based at least in part on one or more guest activities determined from the one or more sensed conditions sensed by the one or more sensors in the corresponding guest room, as indicated at block 114.

The guest sleep quality score for each of a plurality of guest rooms of the hotel may be based at least in part one or more guest room status parameters, wherein the one or more guest room status parameters include one or more of a guest room rented parameter and a guest room occupied parameter. In some cases, each of the plurality of guest rooms includes a corresponding HVAC system (like the HVAC systems 20), and the one or more guest room status parameters may include one or more of an alarm status of the corresponding HVAC system, a cooling valve status of the corresponding HVAC system and a heating valve status of the corresponding HVAC system.

The one or more determined guest activities may include a measure related to a number of interactions with a thermostat in the corresponding guest room that occur during a defined thermostat interaction detection time period at night. The one or more determined guest activities may include a measure related to motion detected by a motion sensor in the corresponding guest room that occur during a defined motion detection time period at night. The one or more determined guest activities may include a measure related to changes in an ambient light level detected by a light sensor in the corresponding guest room that occur during a defined ambient light level detection time period at night. The one or more determined guest activities may include a measure related to a noise detected by a noise detector in the corresponding guest room that occur during a defined noise detection time period at night. In some cases, the thermostat interaction detection time period, the motion detection time period, the ambient light level detection time period and the noise detection time period may each include the period from 2 AM to 3 AM. The guest sleep quality score is displayed for at least some of the two or more of the plurality of guest rooms of the hotel on a display, as indicated at block 116.

In some instances, as optionally indicated at block 120, the method 110 may further include determining which of the plurality of guest rooms have a guest sleep quality score that is below a guest sleep quality threshold. The method 110 may further include determining one or more possible root causes for at least some of the plurality of guest rooms that have a guest sleep quality score that is below the guest sleep quality threshold, as optionally indicated at block 122. The method 110 may further include displaying the determined one or more possible root causes for at least one of the plurality of guest rooms that have a guest sleep quality score that is below the guest sleep quality threshold, as optionally indicated at block 122.

In some cases, the remote server 14 and/or the computing device 32 may be configured to display a dashboard that allows a user to quickly and easily see how a particular guest room 16 may be performing relative to other guest rooms 16 within the hotel 12, or even in comparison with the performance of similar guest rooms in other hotels. FIGS. 6A through 6F provide an example of a dashboard that may be displayed pertaining to energy, including graphical representations of many of the parameters used in calculating an energy score. FIGS. 7A through 7D provide an example of a dashboard that may be displayed pertaining to guest comfort.

In some instances, the energy score may be considered as being indicative of how well potential opportunities to conserve energy were actually taken advantage of. Detecting when a guest room 16 is empty (either not rented or rented but not currently occupied) and allowing the temperature set point to drift farther is an example of taking advantage of an opportunity to conserve energy while not negatively impacting a guest. Allowing an empty room (either not rented or rented but not currently occupied) to maintain at a comfort temperature set point is an example of failing to take advantage of an opportunity to conserve energy.

Figure 6A:
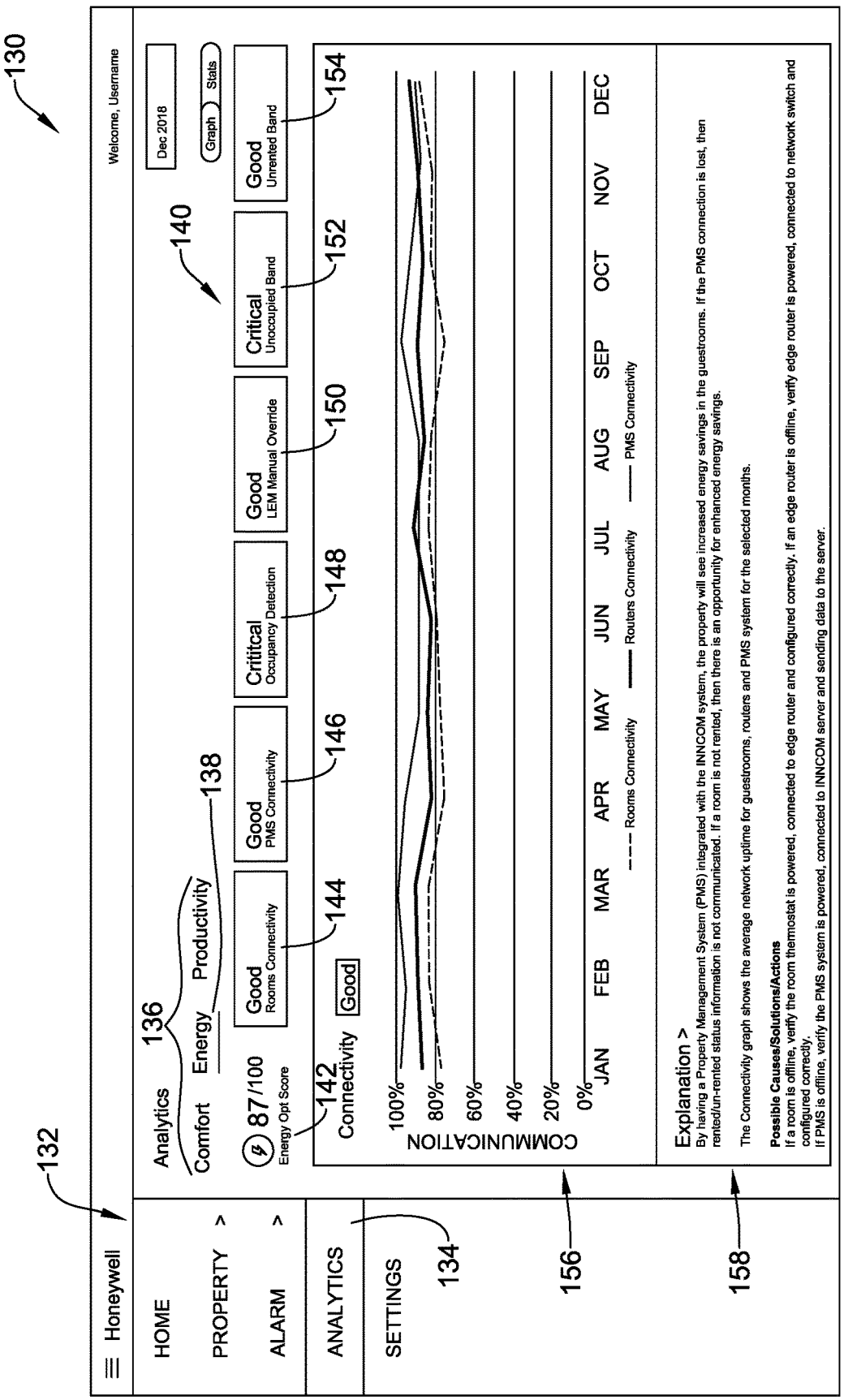
FIG. 6A through 6F illustrate an energy-related dashboard.

FIG. 6A is a screen shot showing a dashboard 130 that may be generated by the remote server 14 and displayed on the display 34 of the computing device 32. In some cases, the dashboard 130 may be generated directly by the computing device 32. The dashboard 130 includes a menu 132 that allows a user to choose what features they wish to view. As shown, the user has selected Analytics, as indicated by a highlighted icon 134. Across the top of the dashboard 130 is a sub-menu 136 that allows a user to choose which analytics information they wish to view. As shown, the user has selected Energy, as indicated by a highlighted icon 138. The dashboard 130 includes a summary row 140 that includes an Energy Score 142, a Rooms Connectivity icon 144, a PMS connectivity icon 146, an Occupancy Detection icon 148, a LEM Manual Override icon 150, an Unoccupied Band icon 152 and an Unrented Band icon 154. Each of the icons includes a rating such as Good, Bad, Fair, Critical such that a user can quickly see what areas may need attention.

The dashboard 130 as shown in FIG. 6A includes a graph 156 that shows connectivity data. It will be appreciated that the graphs shown in FIGS. 6B through 6F are part of the dashboard. A user may scroll up and down through the dashboard 130 to view any of these graphs. They are just separated out for drawing purposes. There is an explanation section 158 that corresponds to the connectivity graph 156, including why the connectivity data is important, and what it means. In some cases, the explanation section 158 also provides suggestions as to how to fix particular problems.

Figure 6B:
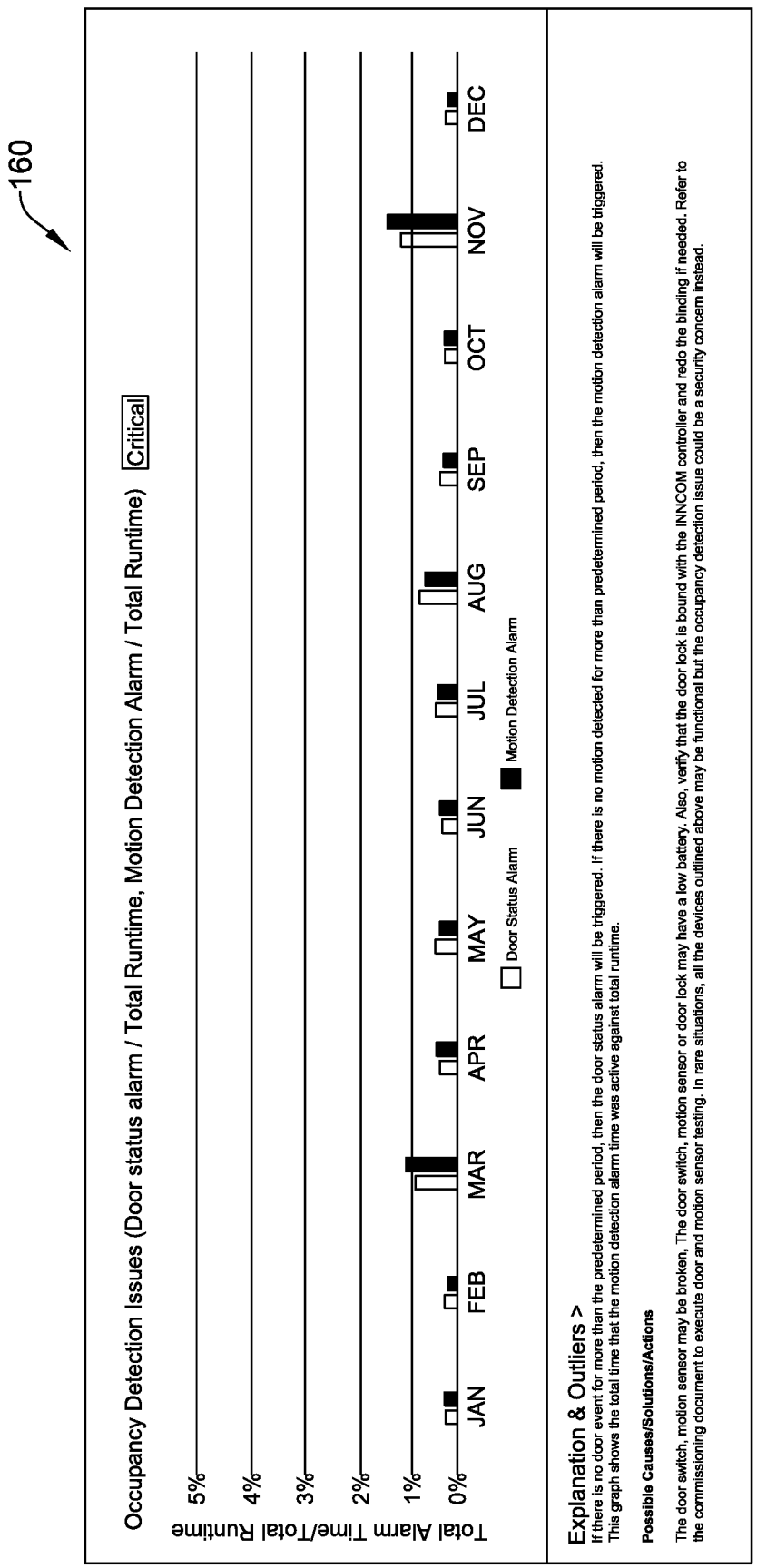

FIG. 6B shows a graph 160 pertaining to occupancy detection issues, such as but not limited to door status alarm data relative to total runtime data and motion detection alarms relative to total runtime data. The graph 160 includes an explanation section 162 that explains what is being illustrated, as well as providing possible suggestions as to how to fix particular problems. For example, FIG. 6B states "If there is not door event for more than a predetermined period, then the door status alarm will be triggered". In this cases, the predetermined time period may be, for example, one week or one month. FIG. 6B also states "If there is no motion detected for more than a predetermined period, then the motion detection alarm will be triggered". Again, the predetermined time period may be, for example, one week or one month.

Figure 6C:
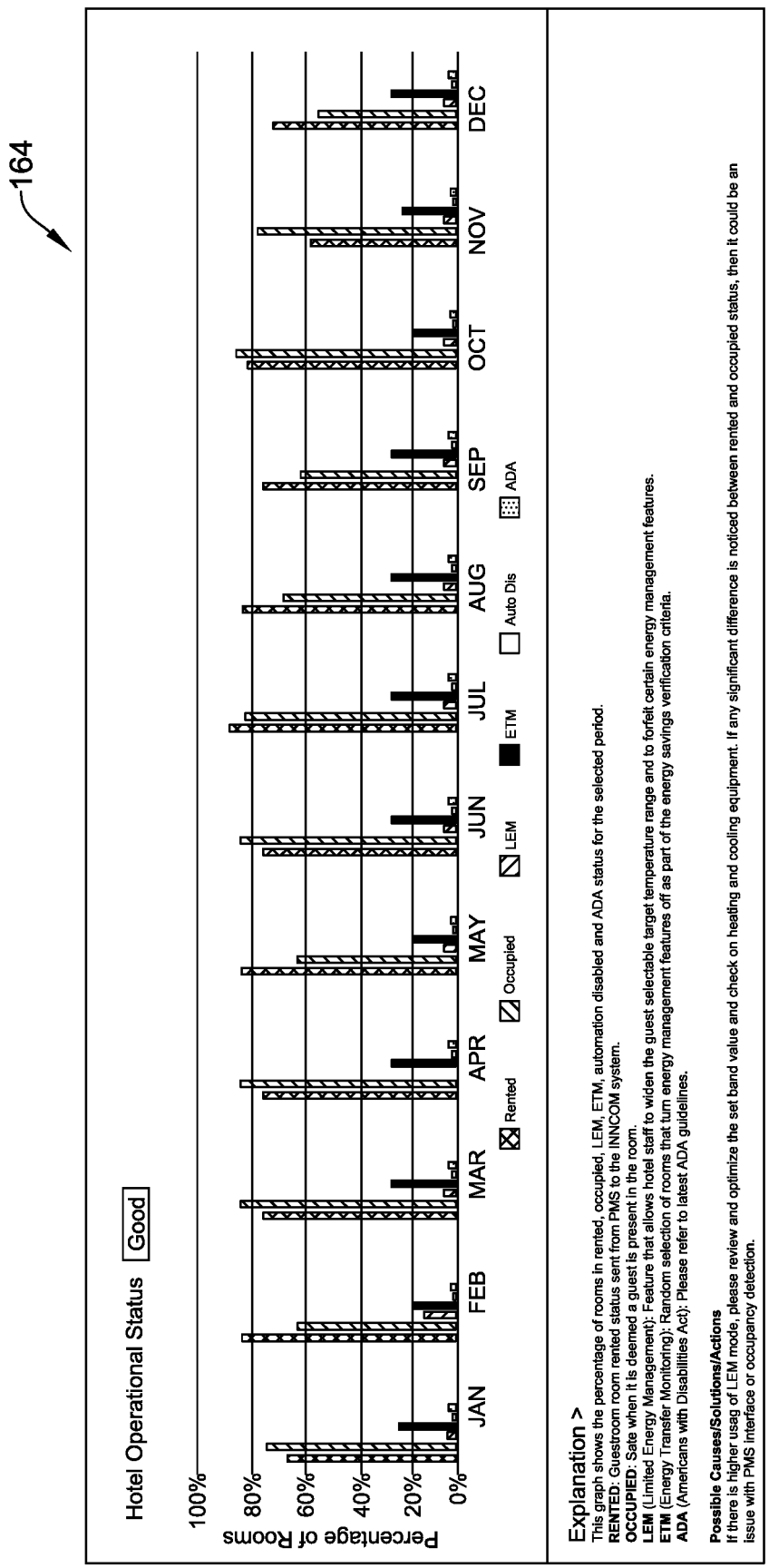

FIG. 6C shows a graph 164 pertaining to hotel operational status. The graph 164 includes data pertaining to percentage of time rooms were rented, percentage of time rooms were occupied. FIG. 6C also shows percentage of time LEM (Limited Energy Management), ETM (Energy Transfer Monitoring), Auto Dis (Automatic Disable) and ADA (American Disabilities Act) accommodations were used. The graph 164 also includes an explanation section 166 that explains what is being illustrated, as well as providing possible suggestions as to how to fix particular problems.

Figure 6D:
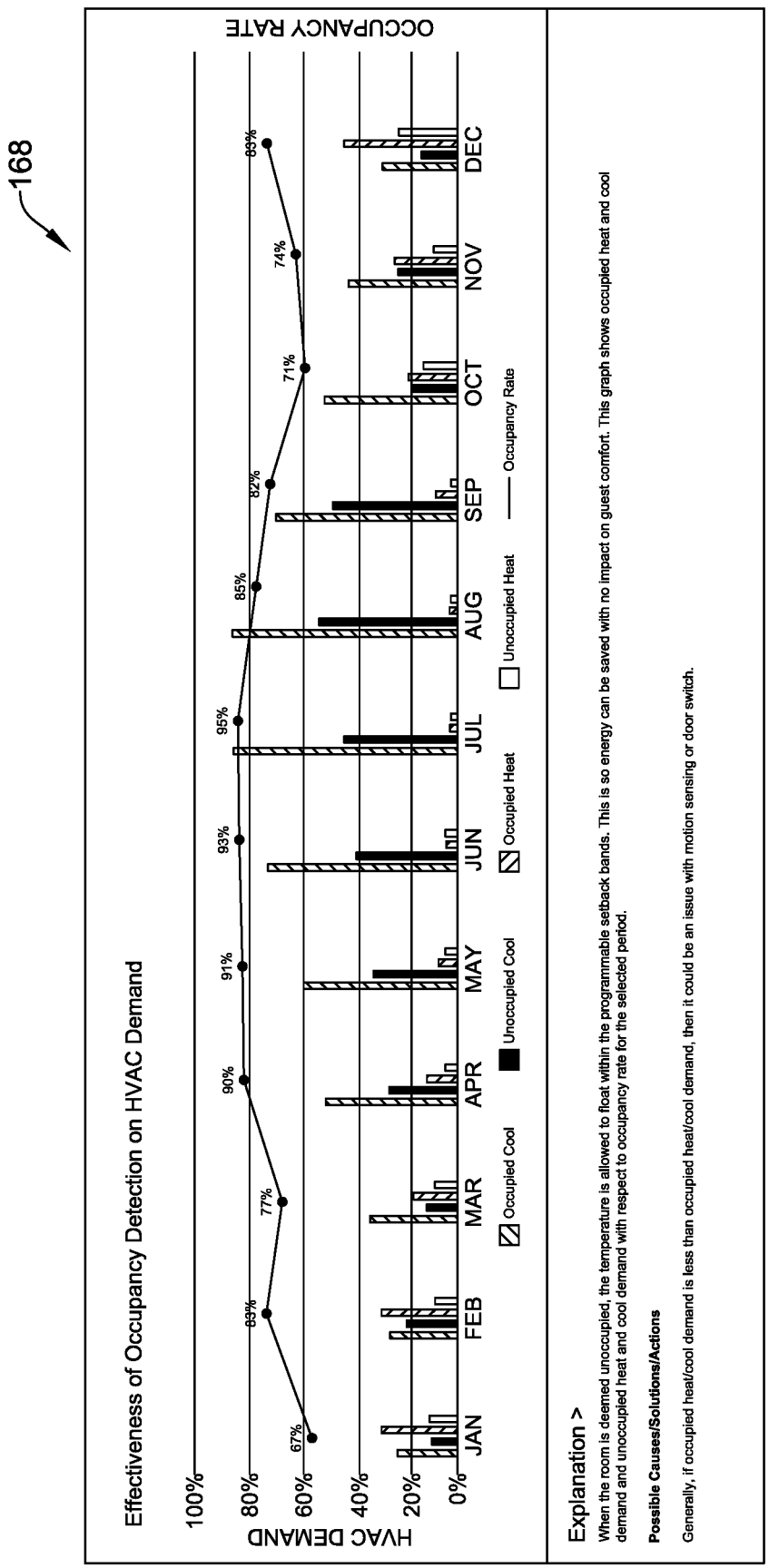

FIG. 6D shows a graph 168 pertaining to effectiveness of occupancy detection on HVAC demand. The graph 168 includes information pertaining to percentages of occupied cool, unoccupied cool, occupied heat, unoccupied heat and occupancy rate. The graph 168 also includes an explanation section 170 that explains what is being illustrated, as well as providing possible suggestions as to how to fix particular problems.

Figure 6E:
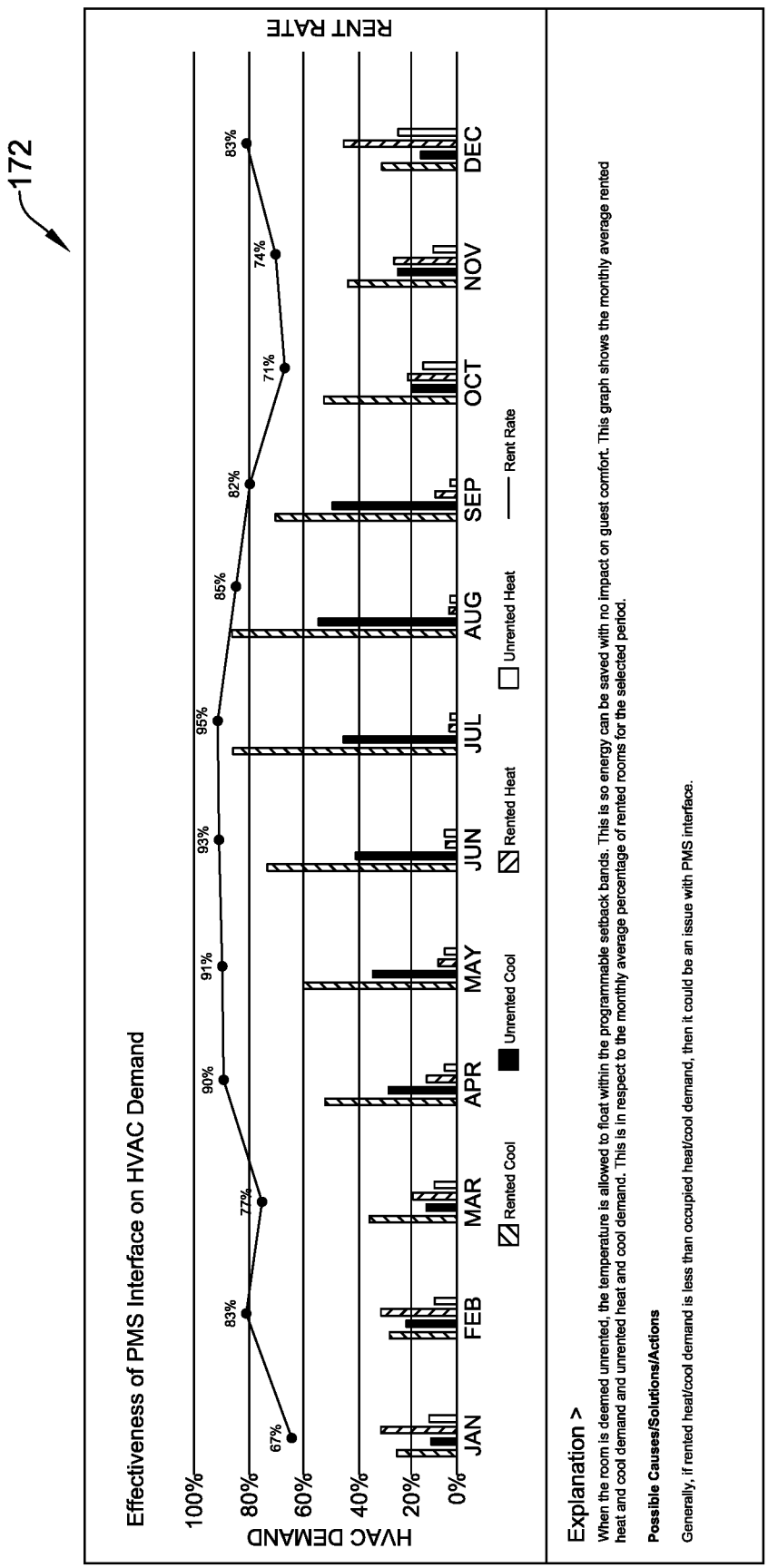

FIG. 6E shows a graph 172 pertaining to effectiveness of PMS interface on HVAC demand. The graph 172 includes information pertaining to percentages of rented cool, unrented cool, rented heat, unrented heat and rental rate. The graph 172 also includes an explanation section 174 that explains what is being illustrated, as well as providing possible suggestions as to how to fix particular problems.

Figure 6F:
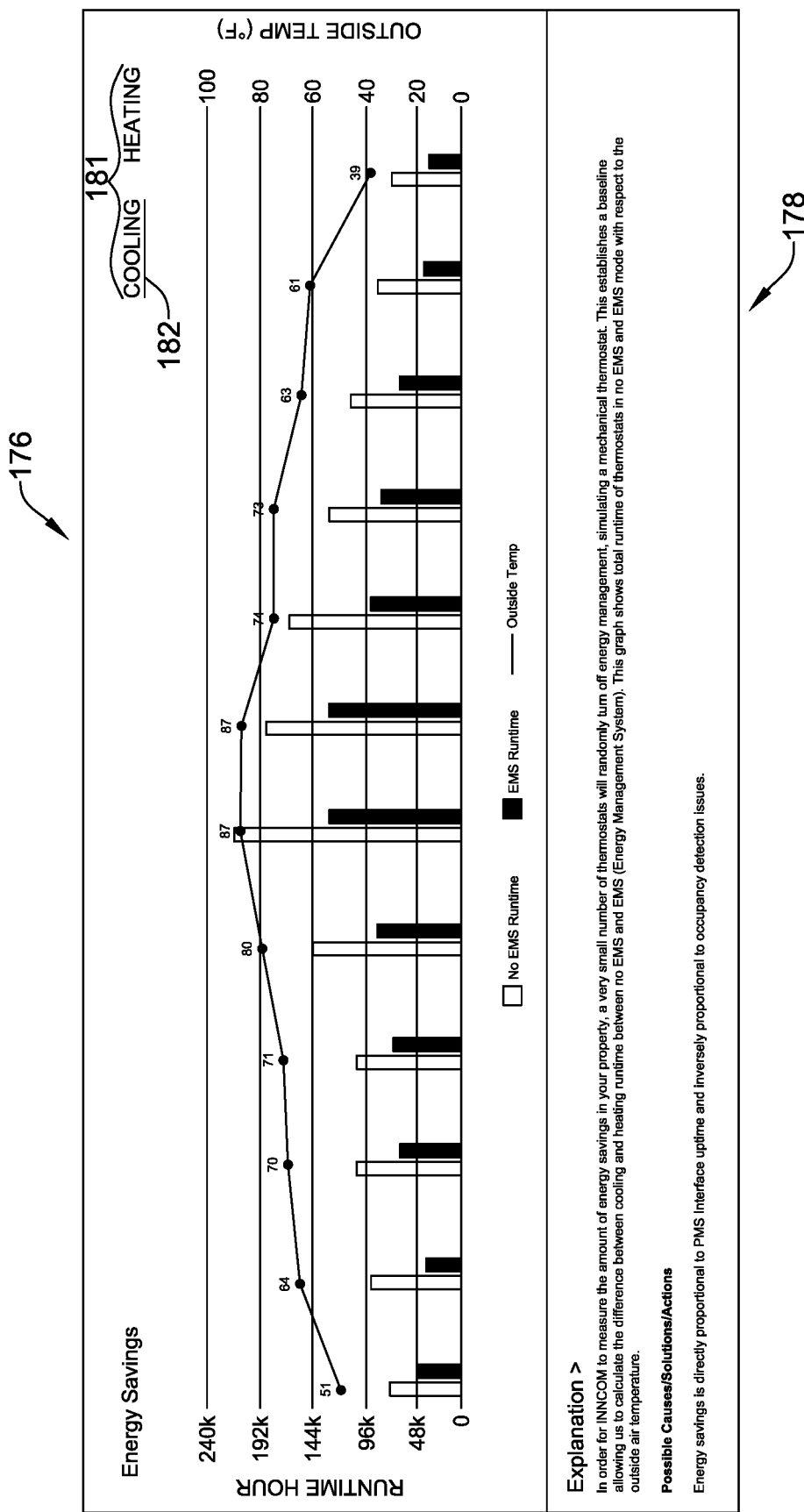

FIG. 6F shows a graph 176 pertaining to energy savings. The graph 176 includes information pertaining to EMS runtime, non-EMS runtime and outside temperature. The graph 176 includes a menu 181 that allows a user to select between heating and cooling. As indicated by a highlighted COOLING icon 182, the graph 176 is currently displaying energy savings pertaining to cooling. The graph 176 also includes an explanation section 178 that explains what is being illustrated, as well as providing possible suggestions as to how to fix particular problems.

Figure 7A:
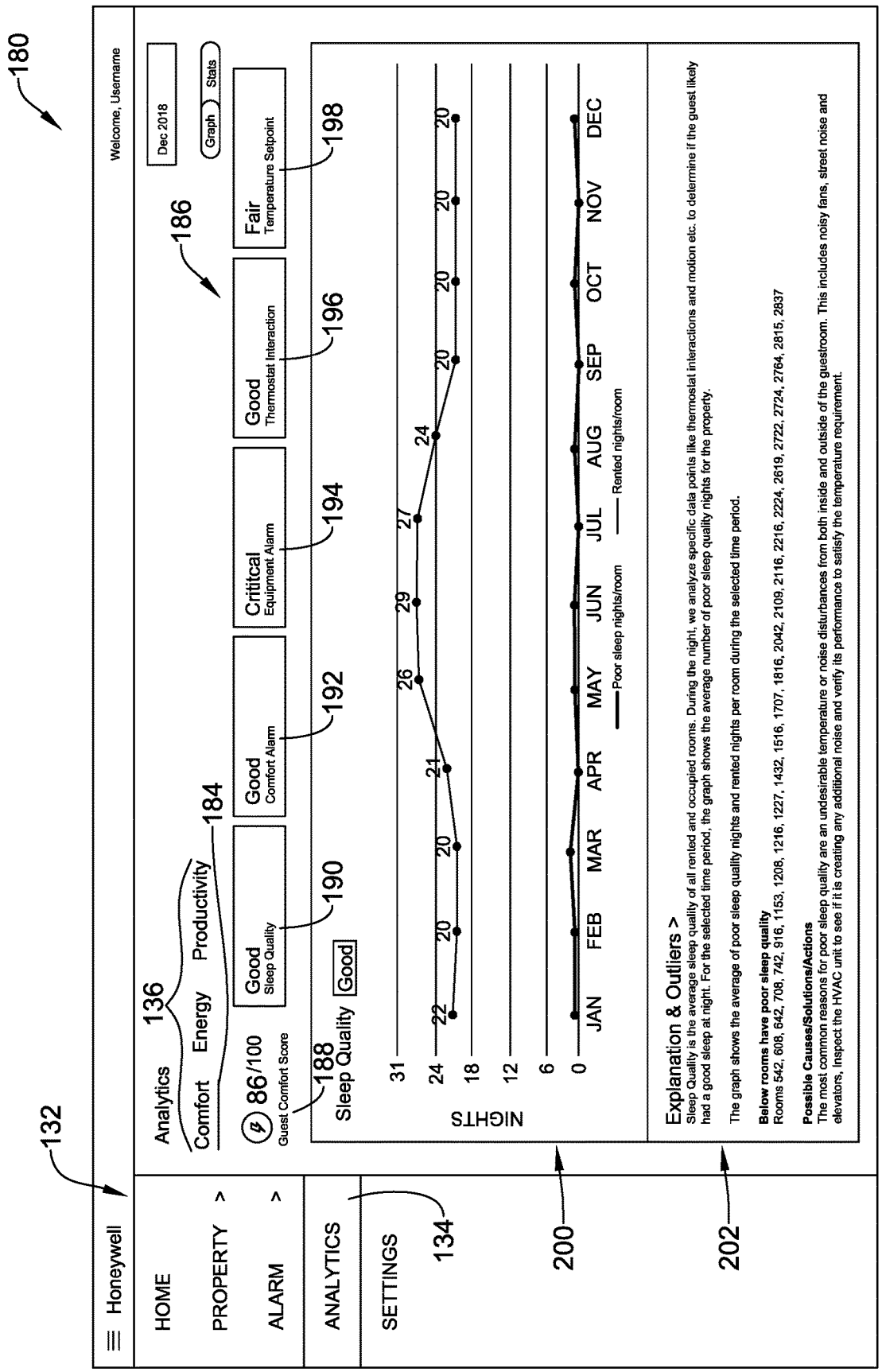
FIG. 7A through 7D illustrate a guest comfort-related dashboard.

FIG. 7A is a screen shot showing a dashboard 180 that may be generated by the remote server 14 and displayed on the display 34 of the computing device 32. In some cases, the dashboard 130 may be generated directly by the computing device 32. The menu 132 allows a user to choose what features they wish to view. As shown, the user has selected Analytics, as indicated by the highlighted icon 134.

The sub-menu 136 allows a user to choose which analytics information they wish to view. As shown, the user has selected Comfort, as indicated by a highlighted icon 184. The dashboard 180 includes a summary row 186 that includes a Comfort Score 188, a Sleep Quality icon 190, a Comfort Alarm icon 192, an Equipment Alarm icon 194, a Thermostat Interaction icon 196 and a Temperature Setpoint icon 198. Each of the icons includes a rating such as Good, Bad, Fair, Critical such that a user can quickly see what areas may need attention.

Figure 7B:
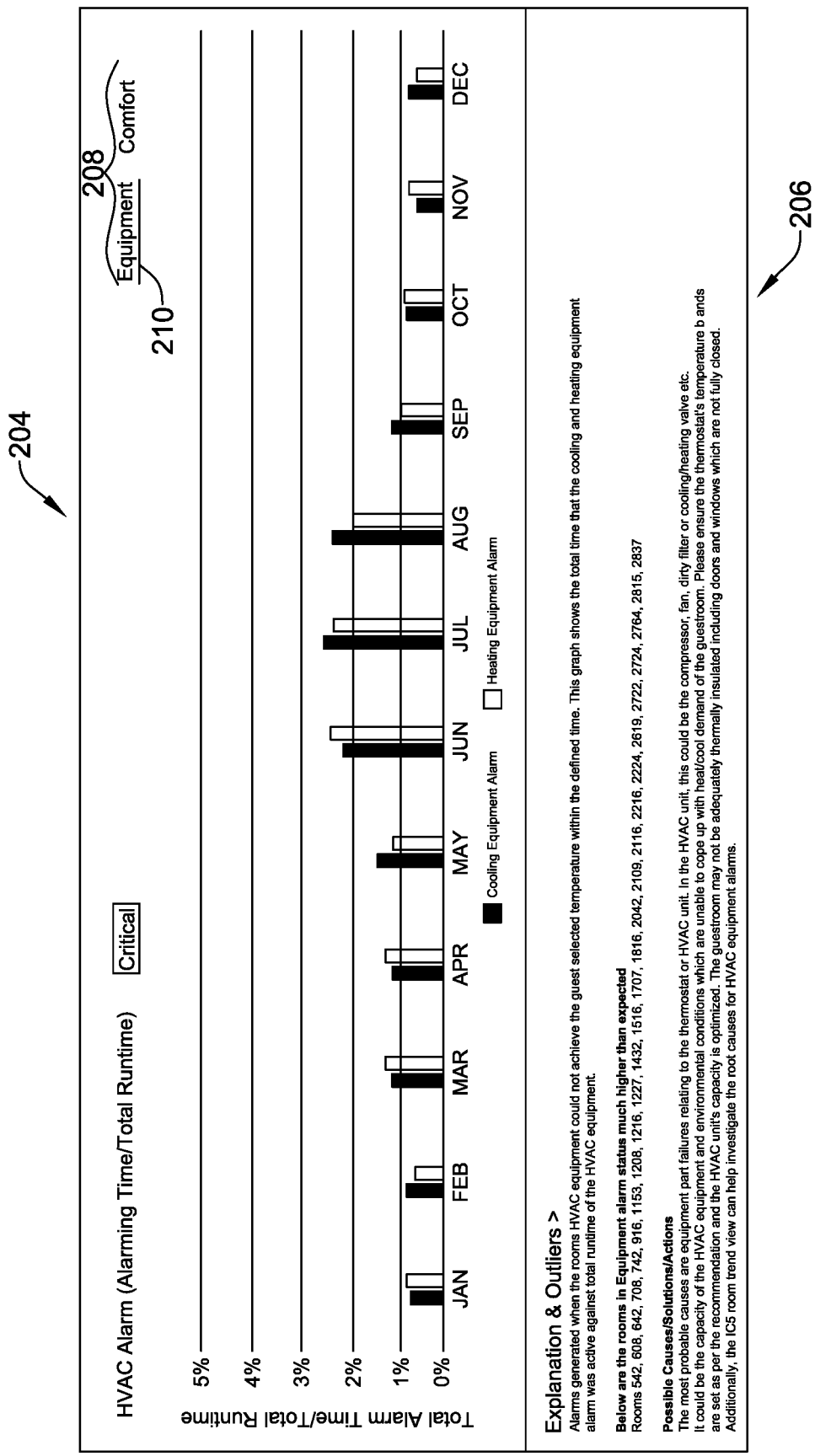
Figure 7C:
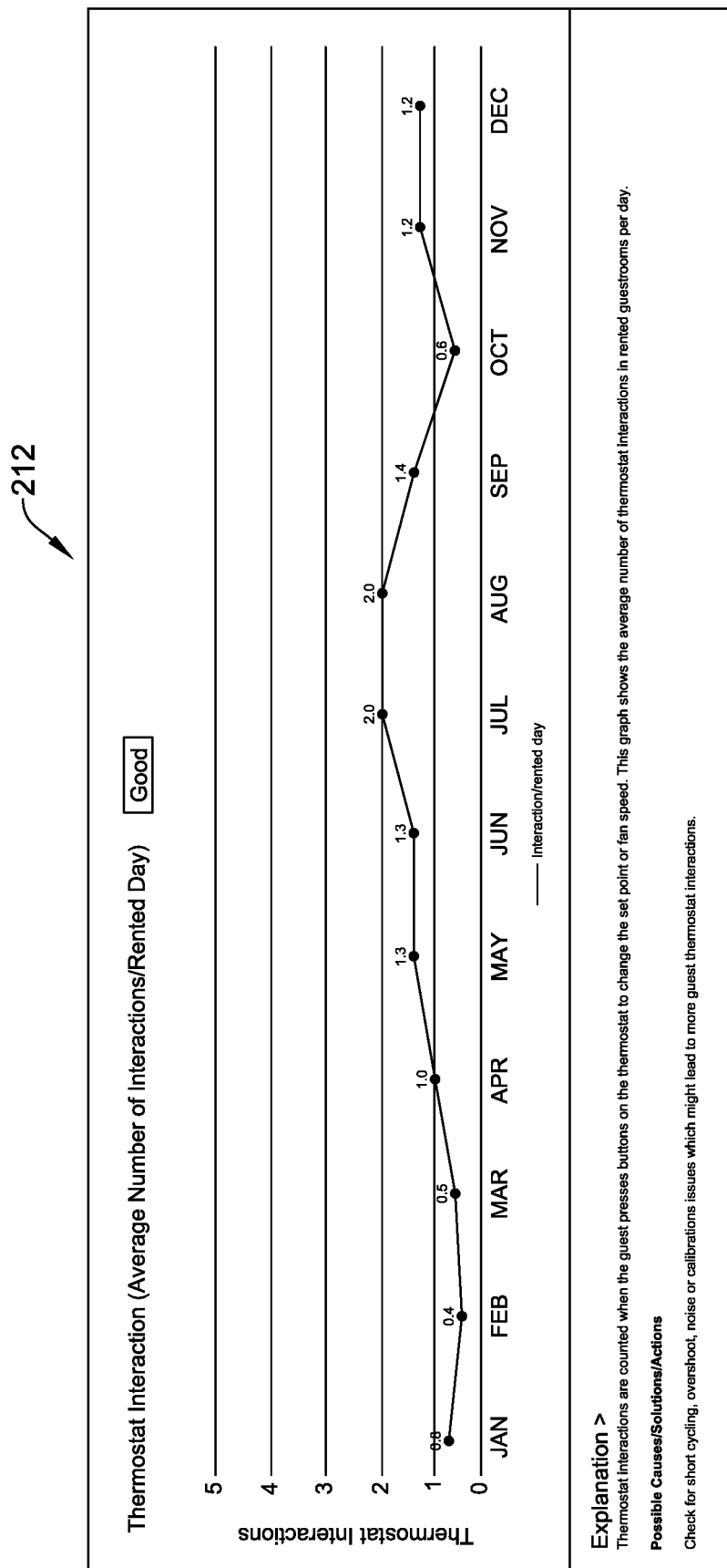
Figure 7D:
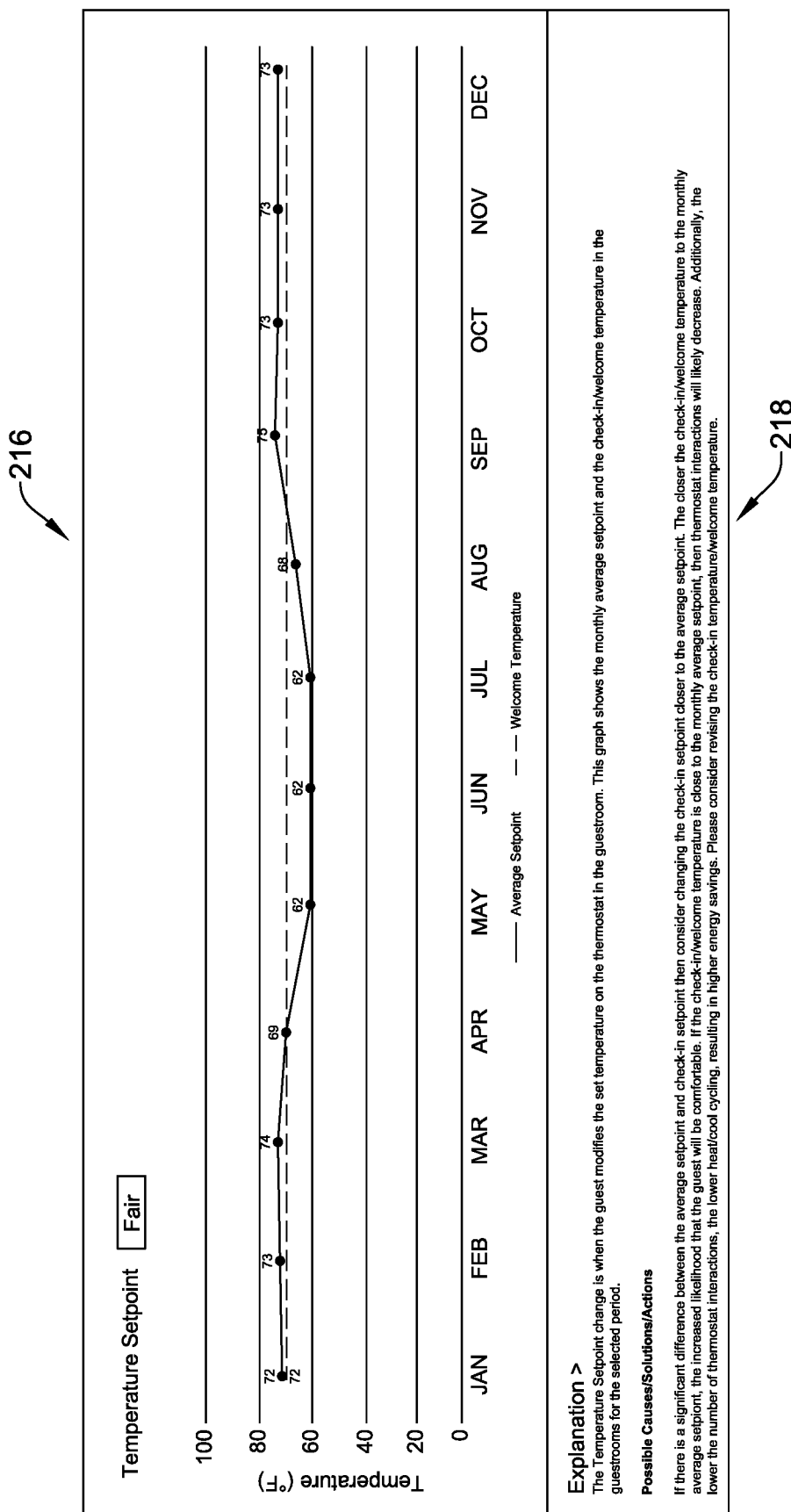

The dashboard 180 as shown in FIG. 7A includes a graph 200 that shows sleep quality data. The graph 200 includes information pertaining to number of poor nights of sleep have been reported relative to how many nights each room has been rented. It will be appreciated that the graphs shown in FIGS. 7B through 7D are part of the dashboard 180. A user may scroll up and down through the dashboard 180 to view any of these graphs. They are just separated out for drawing purposes. There is an explanation section 202 that corresponds to the sleep quality graph 200, including why the connectivity data is important, and what it means. In some cases, the explanation section 202 also provides suggestions as to how to fix particular problems.

FIG. 7B shows a graph 204 pertaining to HVAC alarms. The graph 204 includes information pertaining to cooling equipment alarms and heating equipment alarms. The graph 204 includes a menu 208 that allows a user to select between displaying equipment alarms and comfort alarms. As indicated by a highlighted EQUIPMENT icon 210, the graph 204 is currently displaying equipment alarms. The graph 204 also includes an explanation section 206 that explains what is being illustrated, as well as providing possible suggestions as to how to fix particular problems. In the example show, the explanation section 206 also identifies those rooms in the hotel 12 that were in equipment alarm status much higher than expected.

FIG. 7C shows a graph 212 pertaining to thermostat interactions. The graph 212 includes information pertaining to how many times per day a guest interacted with the thermostat in their particular guest room. If a guest interacts frequently with the thermostat, this can indicate that the guest is not comfortable. This can mean that there are HVAC equipment issues, for example. On the other hand, this could also indicate a family renting the room, where individual members of the family do not agree with respect to a desired temperature set point. The graph 212 also includes an explanation section 214 that explains what is being illustrated, as well as providing possible suggestions as to how to fix particular problems.

FIG. 7D shows a graph 216 pertaining to thermostat set points. The graph 216 includes information pertaining to actual (guest) temperature set points relative to a welcome temperature set point set by the hotel. This may alert the hotel staff to change the welcome temperature set point with the seasons to match their guest preferences. The graph 216 also includes an explanation section 218 that explains what is being illustrated, as well as providing possible suggestions as to how to fix particular problems.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A system comprising:
   three or more sensors positioned within a guest room of a hotel, the three or more sensors including:
   a thermostat for sensing temperature in the guest room and for controlling an HVAC system that services the guest room;
   a motion sensor for detecting motion in the guest room;
   a light sensor for detecting light in the guest room;
   a controller operatively coupled to the three or more sensors, the controller configured to:
   identify a predetermined time period when a guest of the guest room is expected to be sleeping in the guest room;
   determine how many guest interactions occur with the thermostat to change one or more comfort settings of the thermostat during the identified predetermined time period;
   determine how many motion events are detected by the motion sensor in the guest room during the identified predetermined time period;
   determine how many changes in light are detected by the light sensor in the guest room caused by guest activities in the guest room during the identified predetermined time period; and
   determine a guest sleep quality score based at least in part on the number of guest interactions with the thermostat, the number of motion events detected by the motion sensor in the guest room and the number of changes in light detected by the light sensor in the guest room during the identified predetermined time period;
   determine when the guest sleep quality score falls below a guest sleep quality score threshold, and if so, determine one or more possible root causes that caused the guest sleep quality score to fall below the guest sleep quality threshold; and
   display the guest sleep quality score on a display, and when it is determined that the guest sleep quality score falls below the guest sleep quality score threshold, display the one or more possible root causes on the display.

2. The system of claim 1, wherein the three or more sensors further comprises a noise detector for detecting noise in the guest room, and the controller is further configured to:
   determine an indication quantifying noise detected by the noise detector in the guest room during the identified predetermined time period; and
   determine the guest sleep quality score based at least in part on the number of guest interactions with the thermostat, the number of motion events detected by the motion sensor in the guest room, the number of changes in light detected by the light sensor in the guest room and the indication quantifying noise detected by the noise detector in the guest room during the identified predetermined time period.

3. The system of claim 1, wherein the controller is configured to display the guest sleep quality score for the guest room in combination with a guest sleep quality score for one or more other guest rooms within the hotel.

4. The system of claim 1, wherein one or more of the motion sensor and the light sensor is disposed within the thermostat.

5. The system of claim 1, further comprising taking corrective action to fix one or more of the possible root causes that caused the guest sleep quality score to fall below the guest sleep quality threshold to improve the guest sleep quality score of the guest room.

6. The system of claim 5, wherein the predetermined time period when the guest of the guest room is expected to be sleeping comprise the period from 2 AM to 3 AM.

7. The system of claim 1, wherein the controller only calculates the guest sleep quality score for times when the guest room is determined to be occupied.

8. The system of claim 1, wherein the three or more sensors further comprises one or more bed sensors operatively coupled to a bed in the guest room, and the controller is further configured to:
determine an indication quantifying movement of a guest in the bed detected by the one or more bed sensors during the identified predetermined time period; and
determine the guest sleep quality score based at least in part on the number of guest interactions with the thermostat, the number of motion events detected by the motion sensor in the guest room, the number of changes in light detected by the light sensor in the guest room and the indication quantifying movement of the guest in the bed detected by the one or more bed sensors during the identified predetermined time period.

9. A method of determining a guest sleep quality score for a guest room of a plurality of guest rooms of a hotel facility, each of the plurality of guest rooms including a connected thermostat, the method comprising:
a server identifying a predetermined time period when the guest is expected to be sleeping in the guest room;
the server quantifying guest interactions with the thermostat to change one or more comfort settings of the thermostat during the identified predetermined time period;
the server determining a guest sleep quality score based at least in part on the quantified guest interactions with the thermostat;
the server displaying the guest sleep quality score on a display; and
the server determining when the guest sleep quality score falls below a guest sleep quality score threshold, and if so, determine one or more possible root causes that caused the guest sleep quality score to fall below the guest sleep quality threshold and display the one or more possible root causes on the display.

10. The method of claim 9, further comprising:
the server quantifying changes in ambient light in the guest room during the identified predetermined time period; and
the server determining the guest sleep quality score based at least in part on the quantified guest interactions with the thermostat and the quantified changes in ambient light in the guest room during the identified predetermined time period.

11. The method of claim 10, further comprising displaying on the display the guest sleep quality score for the guest room and also sleep quality scores for other guest rooms.

12. The method of claim 9, further comprising:
the server quantifying motion detected in the guest room during the identified predetermined time period; and
the server determining the guest sleep quality score based at least in part on the quantified guest interactions with the thermostat and the quantified motion detected in the guest room during the identified predetermined time period.

13. The method of claim 9, further comprising:
displaying a list of the plurality of guest rooms that have a guest sleep quality score that is below the guest sleep quality score threshold.

14. A method for evaluating guest sleep quality scores for a plurality of guest rooms within a hotel, the method comprising:
a server identifying a predetermined time period when a guest is expected to be sleeping in a guest room;
the server quantifying changes in ambient light in the guest room caused by guest activities in the guest room during the identified predetermined time period;
the server determining the guest sleep quality score for the guest room based at least in part on the quantified changes in light in the guest room caused by guest activities in the guest room during the identified predetermined time period;
the server displaying the guest sleep quality score on a display; and
the server determining when the guest sleep quality score falls below a guest sleep quality score threshold, and if so, determine one or more possible root causes that caused the guest sleep quality score to fall below the guest sleep quality threshold and display the one or more possible root causes on the display.

15. The method of claim 14, wherein the guest sleep quality score for the guest room is based at least in part one or more guest room status parameters, wherein the one or more guest room status parameters include one or more of:
a guest room rented parameter; and
a guest room occupied parameter.

16. The method of claim 15, wherein each of the plurality of guest rooms includes a corresponding HVAC system for conditioning air within the corresponding guest room, and wherein the one or more guest room status parameters include one or more of:
an alarm status of the corresponding HVAC system;
a cooling valve status of the corresponding HVAC system; and
a heating valve status of the corresponding HVAC system.

17. The method of claim 14, further comprising:
the server quantifying motion detected in the guest room during the identified predetermined time period; and
the server determining the guest sleep quality score based at least in part on the quantified changes in ambient light in the guest room during the identified predetermined time period and the quantified motion detected in the guest room during the identified predetermined time period.

18. The method of claim 14, further comprising
the server quantifying guest interactions with a thermostat of the guest room to change one or more comfort settings of the thermostat during the identified predetermined time period;
the server determining the guest sleep quality score based at least in part on the quantified changes in ambient light in the guest room during the identified predetermined time period and the quantified guest interactions with the thermostat during the identified predetermined time period.

19. The method of claim 14, further comprising:
determining a sleep quality score for each of the plurality of guest rooms;

determining which of the plurality of guest rooms have a guest sleep quality score that is below a guest sleep quality threshold;

determining one or more possible root causes for at least some of the plurality of guest rooms that have a guest sleep quality score that is below the guest sleep quality threshold; and displaying the determined one or more possible root causes for at least one of the plurality of guest rooms that have a guest sleep quality score that is below the guest sleep quality threshold.

* * * * *